(12) United States Patent
Xu et al.

(10) Patent No.: US 12,726,915 B2
(45) Date of Patent: Sep. 1, 2026

(54) DYNAMIC SWITCHING BETWEEN POWER MODE CONFIGURATIONS

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 702 days.

(21) Appl. No.: 17/997,466

(22) PCT Filed: Jun. 9, 2020

(86) PCT No.: PCT/CN2020/095149
§ 371 (c)(1),
(2) Date: Oct. 28, 2022

(87) PCT Pub. No.: WO2021/248317
PCT Pub. Date: Dec. 16, 2021

(65) Prior Publication Data
US 2023/0171709 A1 Jun. 1, 2023

(51) Int. Cl.
*H04W 52/36* (2009.01)
*H04W 52/14* (2009.01)

(52) U.S. Cl.
CPC ......... *H04W 52/36* (2013.01); *H04W 52/146* (2013.01)

(58) Field of Classification Search
CPC . H04W 52/36; H04W 52/146; H04W 52/243; H04W 52/38; H04W 52/143; H04W 52/367
See application file for complete search history.

(56) References Cited

U.S. PATENT DOCUMENTS 8,489,100 B2 7/2013 Vajapeyam et al.
9,094,112 B2 * 7/2015 Perry ..................... H02J 50/80
(Continued)

FOREIGN PATENT DOCUMENTS

CN 1726660 A 1/2006
CN 104363645 A 2/2015
(Continued)

OTHER PUBLICATIONS

FCC (Jay Holcomb (ITRON)): “FCC_R+O_FNPRM_Promoting_unlicensed_use_of_the_6GHz_Band_ET_18-295”, IEEE-SA Mentor, Piscataway, NJ USA, vol. 802.18, No. 2, Apr. 27, 2020, May 21, 2020, 142 Pages, XP068167648, XP068168030, para[ 0018]—[0022], para[ 0189], lines 199-205, lines 36-37.
(Continued)

*Primary Examiner* — Dominic E Rego
(74) *Attorney, Agent, or Firm* — Harrity & Harrity, LLP

(57) ABSTRACT

Wireless communications systems and methods related to wireless communications are provided. A first wireless communication device may communicate with a second wireless communication device, a first power mode configuration including a first transmit power parameter and a first communication signal based on the first power mode configuration. The first wireless communication device may communicate with a second wireless communication device, a second power mode configuration including a second transmit power parameter different from the first transmit power parameter and a second communication signal based on the second power mode configuration.

33 Claims, 15 Drawing Sheets

(56) References Cited

U.S. PATENT DOCUMENTS 9,843,919 B2* 12/2017 Fukuta .................... H04W 4/70
9,844,005 B2* 12/2017 Ouchi .................... H04L 5/0092
10,085,265 B2* 9/2018 Vajapeyam ......... H04W 52/367
10,588,088 B1 3/2020 Pawar et al.
10,959,186 B2* 3/2021 Yasukawa ............ H04B 7/2643
10,999,497 B1* 5/2021 Singh .................. H04N 23/665
11,483,810 B2* 10/2022 Zhang ................. H04W 74/006
11,503,544 B2* 11/2022 Ahmad ................. H04W 72/23
11,570,722 B2* 1/2023 MolavianJazi ....... H04W 52/34
2006/0228113 A1* 10/2006 Cutillo .................. H04L 41/046 398/71
2007/0109974 A1* 5/2007 Cutillo ................. H04M 11/062 370/254
2010/0291888 A1* 11/2010 Hadjichristos ............ H03F 3/72 455/127.4
2012/0106495 A1* 5/2012 Yang ..................... H04L 5/0094 370/329
2012/0176979 A1* 7/2012 Kim ...................... H04W 72/21 370/329
2013/0242895 A1* 9/2013 Chen ..................... H04W 72/04 370/329
2014/0254391 A1* 9/2014 Mahalingam ....... H04W 52/244 370/241.1
2015/0005026 A1* 1/2015 Wild ..................... H04W 48/02 455/522
2015/0043406 A1* 2/2015 Ko ...................... H04W 52/325 370/311
2015/0124673 A1* 5/2015 Ouchi ................... H04W 52/58 370/311
2016/0059713 A1* 3/2016 Herriot ................. B60L 53/122 320/137
2016/0150490 A1* 5/2016 Ouchi ............... H04W 72/0446 455/522
2016/0255665 A1* 9/2016 Futaki ................... H04W 52/40 370/329
2016/0262109 A1* 9/2016 Chen ....................... H04W 4/70
2016/0323887 A1* 11/2016 Patel ................... H04W 52/367
2018/0124650 A1* 5/2018 Park .................. H04W 36/0055
2018/0227912 A1* 8/2018 Chen ..................... H04L 5/0044
2018/0279229 A1* 9/2018 Dinan ............... H04W 74/0833
2019/0007948 A1* 1/2019 Vajapeyam ......... H04W 52/146
2019/0037505 A1* 1/2019 Wang ........................ H04L 5/00
2019/0052339 A1* 2/2019 Zhou ..................... H04W 52/40
2019/0053305 A1* 2/2019 Saiwai .................. H04L 5/0053
2019/0089351 A1* 3/2019 Noguchi ................. H01L 23/50
2019/0159155 A1* 5/2019 Abedini ............ H04W 56/0045
2019/0165904 A1* 5/2019 Jo ......................... H04L 5/0053
2019/0174429 A1* 6/2019 Wang .................. H04W 52/383
2019/0223109 A1* 7/2019 Wang .................. H04W 72/542
2019/0261234 A1* 8/2019 Park .................... H04W 36/085
2019/0261284 A1* 8/2019 Moroga ................ H04W 52/36
2019/0261289 A1* 8/2019 Raghavan ........... H04W 52/367
2019/0274162 A1 9/2019 Zhang et al.
2019/0313343 A1 10/2019 Molavianjazi et al.
2019/0387450 A1* 12/2019 Chen .................... H04B 1/0003
2020/0014599 A1 1/2020 Asterjadhi et al.
2020/0045735 A1* 2/2020 Kim ...................... H04W 52/36
2020/0100179 A1* 3/2020 Zhou ..................... H04W 24/02
2020/0107266 A1* 4/2020 Liao ...................... H04W 76/28
2020/0245263 A1* 7/2020 Wu ..................... H04W 52/325
2020/0252884 A1* 8/2020 Takahashi ............. H04W 48/20
2020/0305140 A1* 9/2020 Song ................. H04W 72/0446
2020/0305191 A1* 9/2020 Moon ................... H04W 72/23
2020/0374813 A1* 11/2020 Feng ................... H04W 52/346
2020/0387182 A1* 12/2020 De Vos ..................... G05F 1/46
2021/0185683 A1* 6/2021 Reial ..................... H04L 5/0042
2021/0195675 A1* 6/2021 Park ...................... H04W 88/14
2021/0227604 A1* 7/2021 Huang ................ H04W 40/248
2021/0235492 A1* 7/2021 Iyer ....................... H04W 72/23
2021/0259040 A1* 8/2021 Babaei .................. H04W 72/23
2021/0410107 A1* 12/2021 Park ...................... H04W 68/02
2022/0061074 A1* 2/2022 Babaei .................. H04L 5/0053
2022/0322107 A1* 10/2022 Wang ..................... G06N 3/092
2022/0346028 A1* 10/2022 Cirik ..................... H04W 52/54
2024/0314576 A1* 9/2024 Ramachandran ... H04W 64/003
2025/0365663 A1* 11/2025 Zhou ..................... H04W 24/02

FOREIGN PATENT DOCUMENTS

WO 2011130432 10/2011
WO 2019055289 A1 3/2019
WO 2019099634 A1 5/2019
WO 2019193419 A2 10/2019

OTHER PUBLICATIONS

Qualcomm Incorporated: "NR-U 6 GHZ Bands n96 and n97", 3GPP TSG-RAN WG4 #95-e, R4-2008123, 3rd Generation Partnership Project, Mobile Competence Centre, 650, Route Des Lucioles, F-06921 Sophia-Antipolis Cedex, France, vol. RAN WG4, No. Electronic Meeting, May 25, 2020-Jun. 5, 2020, May 15, 2020, 5 Pages, XP052412746, section 2.5.

Supplementary European Search Report—EP20939868—Search Authority—The Hague—Feb. 8, 2024.

China Unicom: "5G_HYPOS: Power Saving Mechanism of Wearable Devices", 3GPP TSG-SA WG1 Meeting #80, S1-174357, Dec. 1, 2017 (Dec. 1, 2017), 3 Pages, the whole document.

International Search Report and Written Opinion—PCT/CN2020/095149—ISA/EPO—Feb. 24, 2021.

Panasonic: "Discussion on NR Power Control Framework", 3GPP TSG RAN WG1 MeetingNR-AH#3, R1-1716535, Sep. 21, 2017 (Sep. 21, 2017), 4 Pages, p. 2, Proposal 1—p. 3 , Proposal 6.

Qualcomm Incorporated: "DL Signals and Channels for NR-U," 3GPP Draft, 3GPP TSG RAN WG1 Meeting#97, R1-1907259, 7.2.2.1.2 DL Signals and Channels for NR-U, 3rd Generation Partnership Project (3GPP), Mobile Competence Centre, 650, Route Des Lucioles, F-06921, Sophia-Antipolis Cedex, France, vol. RAN WG1, No. Reno, US, May 13, 2019-May 17, 2019, May 13, 2019 (May 13, 2019), XP051728699, 12 pahes, section 4; p. 6—p. 8 section 7; p. 9—p. 10, the Whole Document.

Panasonic: "Discussion on NR Power Control Framework", 3GPP TSG RAN WG1 MeetingNR-AH#3, R1-1716535, Nagoya, Japan, Sep. 18-21, 2017, pp. 1-4.

* cited by examiner

200

| | Device Class 202 | Operating Bands 204 | Maximum EIRP 206 | Maximum EIRP PSD 208 |
|---|---|---|---|---|
| 210 | Standard Power AP (AFC Controlled) | U-NII-5 (5.925-6.425 GHz)<br>U-NII-7 (6.525-6.875 GHz) | 36 dBm | 23 dBm/MHz |
| 212 | Client Connected to Standard Power AP | | 30 dBm | 17 dBm/MHz |
| 214 | Low Power AP (Indoor only) | U-NII-5 (5.925-6.425 GHz)<br>U-NII-6 (6.425-6.525 GHz)<br>U-NII-7 (6.525-6.875 GHz)<br>U-NII-8 (6.875-7.125 GHz) | 30 dBm | 5 dBm/MHz |
| 216 | Client Connected to Low Power AP | | 24 dBm | -1 dBm/MHz |

600

1100

DYNAMIC SWITCHING BETWEEN POWER MODE CONFIGURATIONS

CROSS-REFERENCE TO RELATED APPLICATIONS

The present application is a 35 U.S.C. 371 National Phase entry of Patent Cooperation Treaty (PCT) Application No. PCT/CN2020/095149, filed Jun. 9, 2020, which is hereby incorporated by reference in its entirety as if fully set forth below for all applicable purposes.

TECHNICAL FIELD

This application relates to wireless communication systems, and more particularly to dynamic switching between power mode configurations.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes communicating, with a second wireless communication device, a first power mode configuration including a first transmit power parameter; communicating, with the second wireless communication device, a first communication signal based on the first power mode configuration; communicating, with the second wireless communication device, a second power mode configuration including a second transmit power parameter different from the first transmit power parameter; and communicating, with the second wireless communication device, a second communication signal based on the second power mode configuration.

In an additional aspect of the disclosure, a method of wireless communication includes transmitting, to a first user equipment (UE), a first power mode configuration including a first transmit power parameter specific to the first UE; receiving, from the first UE, a first communication signal based on the first power mode configuration; transmitting, to a second UE different from the first UE, a second power mode configuration including a second transmit power parameter specific to the second UE; and receiving, from the second UE, a second communication signal based on the second power mode configuration.

In an additional aspect of the disclosure, a method of wireless communication includes receiving, from a base station (BS), a first power mode configuration including a first transmit power parameter specific to the UE, the first transmit power parameter including at least one of a maximum transmit power or a maximum transmit power spectral density (PSD); and transmitting, to the BS, a communication signal based on the first power mode configuration.

In an additional aspect of the disclosure, an apparatus (e.g., BS) includes a transceiver configured to: communicate, with a second wireless communication device, a first power mode configuration including a first transmit power parameter; communicate, with the second wireless communication device, a first communication signal based on the first power mode configuration; communicate, with the second wireless communication device, a second power mode configuration including a second transmit power parameter different from the first transmit power parameter; and communicate, with the second wireless communication device, a second communication signal based on the second power mode configuration.

In an additional aspect of the disclosure, an apparatus (e.g., BS) includes a transceiver configured to: transmit, to a first user equipment (UE), a first power mode configuration including a first transmit power parameter specific to the first UE; receive, from the first UE, a first communication signal based on the first power mode configuration; transmit, to a second UE different from the first UE, a second power mode configuration including a second transmit power parameter specific to the second UE; and receive, from the second UE, a second communication signal based on the second power mode configuration.

In an additional aspect of the disclosure, an apparatus (e.g., UE) includes a transceiver configured to: receive, from a base station (BS), a first power mode configuration including a first transmit power parameter specific to the UE, the first transmit power parameter including at least one of a maximum transmit power or a maximum transmit power spectral density (PSD); and transmit, to the BS, a communication signal based on the first power mode configuration.

In an additional aspect of the disclosure, a computer-readable medium having program code recorded thereon, the program code including: code for causing a first wireless communication device to communicate with a second wireless communication device, a first power mode configuration including a first transmit power parameter; code for causing the first wireless communication device to communicate with the second wireless communication device, a first communication signal based on the first power mode configuration; code for causing the first wireless communication device to communicate with the second wireless communication device, a second power mode configuration including a second transmit power parameter different from the first transmit power parameter; and code for causing the first wireless communication device to communicate with the second wireless communication device, a second communication signal based on the second power mode configuration.

In an additional aspect of the disclosure, a computer-readable medium having program code recorded thereon, the program code including: code for causing a base station (BS) to transmit to a first user equipment (UE), a first power mode configuration including a first transmit power parameter specific to the first UE; code for causing the BS to receive from the first UE, a first communication signal based on the first power mode configuration; code for causing the BS to transmit to a second UE different from the first UE, a second power mode configuration including a second transmit power parameter specific to the second UE; and code for causing the BS to receive from the second UE, a second communication signal based on the second power mode configuration.

In an additional aspect of the disclosure, a computer-readable medium having program code recorded thereon, the program code including: code for causing a user equipment (UE) to receive from a base station (BS), a first power mode configuration including a first transmit power parameter specific to the UE, the first transmit power parameter including at least one of a maximum transmit power or a maximum transmit power spectral density (PSD); and code for causing the UE to transmit to the BS, a communication signal based on the first power mode configuration.

In an additional aspect of the disclosure, an apparatus includes: means for communicating, with a second wireless communication device, a first power mode configuration including a first transmit power parameter; means for communicating, with the second wireless communication device, a first communication signal based on the first power mode configuration; means for communicating, with the second wireless communication device, a second power mode configuration including a second transmit power parameter different from the first transmit power parameter; and means for communicating, with the second wireless communication device, a second communication signal based on the second power mode configuration.

In an additional aspect of the disclosure, an apparatus includes: means for transmitting, to a first user equipment (UE), a first power mode configuration including a first transmit power parameter specific to the first UE; means for receiving, from the first UE, a first communication signal based on the first power mode configuration; means for transmitting, to a second UE different from the first UE, a second power mode configuration including a second transmit power parameter specific to the second UE; and means for receiving, from the second UE, a second communication signal based on the second power mode configuration.

In an additional aspect of the disclosure, an apparatus includes: means for receiving from a base station (BS), a first power mode configuration including a first transmit power parameter specific to the UE, the first transmit power parameter including at least one of a maximum transmit power or a maximum transmit power spectral density (PSD); and means for transmitting to the BS, a communication signal based on the first power mode configuration.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
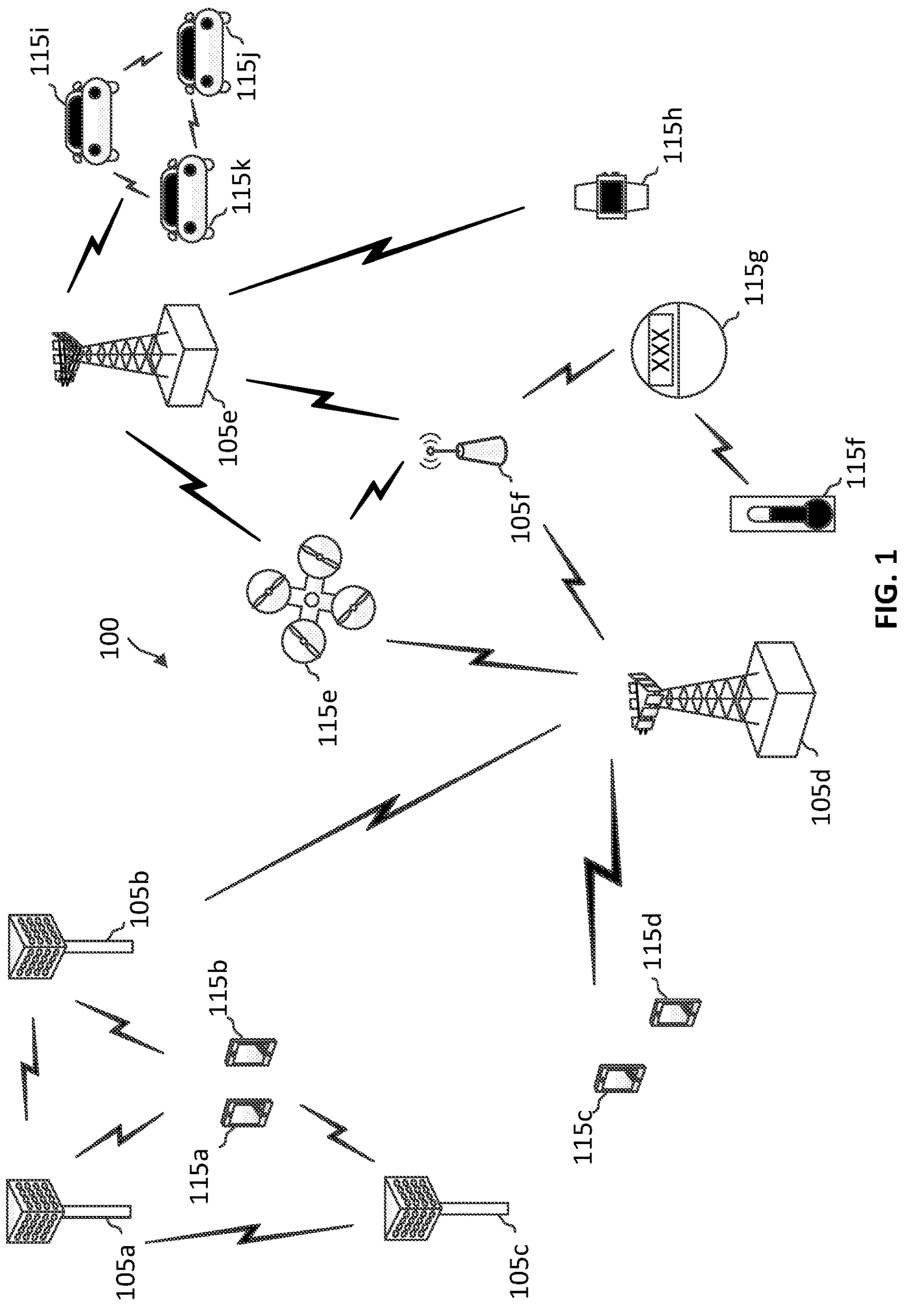
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kilohertz (kHz), for example over 5, 10, 20 megahertz (MHz), and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

An access point (AP) operating in a network may refer to a U-NII transceiver that operates either as a bridge in a peer-to-peer connection or as a connector between the wired and wireless segments of the network or as a relay between wireless network segments. Various APs such as, for example, a standard power (SP) AP or a low-power indoor (LPI) AP, may operate in the network. In the present disclosure, LPI may also refer to low power (indoor or outdoor). For an SP mode configuration, a BS may communicate with an automated frequency coordination (AFC) system, which may automatically determine and provide lists of which frequencies are available for use by SP APs operating in, for example, particular bands (e.g., the 5.925-6.425 GHz band and 6.525-6.875 GHz band). For an LP mode configuration, it may be unnecessary for the BS to communicate with the AFC system. In some aspects, the BS may communicate with the AFC system for the LP mode configuration.

The BS may communicate with the AFC system to, for example, determine a maximum equivalent isotropically radiated power (EIRP) and/or a maximum EIRP power spectral density (PSD). The BS may use different sets of subbands with different EIRP or PSD specifications. In some aspects, the BS may switch between a first power mode configuration and a second power mode configuration. In some instances, the first power mode configuration may be the SP mode configuration and the second power mode configuration may be the LP mode configuration. In some instances, the first power mode configuration may be a first SP mode configuration and the second power mode configuration may be a second mode configuration. In an instance, a wider bandwidth may require a lower PSD to maintain the same total EIRP.

The maximum transmit power of a UE may be about 6 dBm lower than the maximum allowed transmit power of the SP AP (e.g., BS). If if the AP is in the LP mode configuration, the UE may have a maximum EIRP PSD of −1 decibel milliwatts (dBm)/Megahertz (MHz). The maximum transmit PSD of a UE may be about 6 dBm lower than the maximum allowed transmit PSD of the SP AP (e.g., BS). If the AP is in the SP mode configuration, the UE may have a maximum EIRP PSD of 17 dBm/MHz or a maximum EIRP of 30 dBm. The maximum transmit power of a UE may be about 6 dBm lower than the maximum allowed transmit power of the SP AP (e.g., BS). As long as the AP is compliant with the standards or regulations (e.g., Federal Communications Commission (FCC) regulation(s)) and satisfies what is given by the AFC system, there may be no restrictions on how subbands are used. For example, the AP may choose between wideband (lower power) mode and narrowband (higher power) mode to gain more dimension or improve coverage, respectively. In some instances, the AP is restricted to a frequency for switching power mode configurations.

The BS may transmit to the UE, a system information block (SIB) indicating a maximum transmit power of the BS. The UE may determine the maximum transmit power of the UE based on the SIB. It may be difficult for the UE to determine the maximum transmit EIRP or maximum transmit EIRP PSD if the AP is dynamically changing its power mode configuration (e.g., SP mode configuration, LP mode configuration, etc.).

The present disclosure provides techniques for switching between power mode configurations and providing this information to the UE. In some aspects, the BS may switch between an SP mode configuration and an LP mode configuration. In some aspects, the BS may switch between a first SP mode configuration and a second SP mode configuration. For different scenarios, each mode configuration may have its own advantages. For instance, for the SP mode configuration, the BS and the UE may transmit with high power. For the LP mode configuration, the PSD is lower compared to the SP mode configuration.

An advantage of aspects of the disclosure may provide for the BS to switch from a first power mode configuration to a second power mode configuration according to different applications. For instance, a wider band may require a lower PSD to maintain the same total EIRP. If the BS desires a lower PSD and desires to maintain the same total EIRP, the BS may switch from a first subband to a second subband with a wider band than the first subband.

FIG. 1 illustrates a wireless communication network 100 according to one or more aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency RB) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a licensed frequency band, a shared frequency band, and/or an unlicensed frequency band, for example, at about 3.5 gigahertz (GHz), sub-6 GHz or higher frequencies in the mmW band. The network 100 may partition a frequency band into multiple channels, each occupying about 20 megahertz (MHz). The network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

An AP operating in the network 100 may refer to a U-NII transceiver that operates either as a bridge in a peer-to-peer connection or as a connector between the wired and wireless segments of the network 100 or as a relay between wireless network segments. Various APs such as, for example, an SP AP or an LP AP, may operate in the network 100. For an SP mode configuration, a BS 105 communicates with an AFC system, which may automatically determine and provide lists of which frequencies are available for use by SP APs operating in, for example, particular bands (e.g., the 5.925-6.425 GHz band and 6.525-6.875 GHz band).

The BS 105 may communicate with the AFC system to, for example, determine a maximum EIRP and/or a maximum EIRP PSD. A PSD may refer to the total energy output per unit BW from a pulse or sequence of pulses for which the transmit power is at its maximum level, divided by the total duration of the pulses. A pulse may refer to a continuous transmission of a sequence of modulation symbols, during which the average symbol envelope power is constant. The average symbol envelope power may refer to the average, taken over all symbols in the signaling alphabet, of the envelope power for each symbol. For the PSD, the total time does not include the time between pulses during which the transmit power is off or below its maximum level. A maximum PSD may refer to the maximum PSD, within the specified measurement BW, within the U-NII device operating band.

For an LP mode configuration, it may be unnecessary for the BS 105 to communicate with the AFC system. In some aspects, the BS 105 may communicate with the AFC system for the LP mode configuration.

Figure 2:
FIG. 2 is a table illustrating device classes associated with standard power and low power access points (APs) according to one or more aspects of the present disclosure.

FIG. 2 is a table 200 illustrating device classes associated with standard power and low power APs according to one or more aspects of the present disclosure. The table 200 includes a "Device Class" column 202, an "Operating Bands" column 204, a "maximum equivalent isotropically radiated power (EIRP)" column 206, and a "maximum EIRP PSD" column 208. In the table 200, a first entry 210 shows that an SP AP may operate in, for example, the 5.925-6.425 GHz frequency band or the 6.525-6.875 GHz frequency band and may have a maximum EIRP of 36 dBm and/or a maximum EIRP PSD of 23 dBm/MHz. A second entry 212 shows that a client connected to the SP AP may operate in, for example, the 5.925-6.425 GHz frequency band or the 6.525-6.875 GHz frequency band and may have a maximum EIRP of 30 dBm and/or a maximum EIRP PSD of 17 dBm/MHz. The SP AP may be, for example, a BS 105 as discussed in relation to FIG. 1, and the client connected to the SP AP may be, for example, a UE 115 as discussed in relation to FIG. 1. The maximum transmit power of the client (e.g., UE 115) may be 6 dBm lower than the maximum allowed transmit power of the SP AP (e.g., BS 105). In some aspects, the maximum allowed transmit power of the SP AP refers to the maximum EIRP. In some aspects, the maximum allowed transmit power of the SP AP refers to the maximum EIRP PSD.

In the table 200, a third entry 214 shows that an LPI AP may operate in, for example, the 5.925-6.425 GHz frequency band, the 6.425-6.525 GHz frequency band, the 6.525-6.875 GHz frequency band, or the 6.875-7.125 GHz frequency band, and may have a maximum EIRP of 30 dBm and/or a maximum EIRP PSD of 5 dBm/MHz. A fourth entry 216 shows that a client connected to the LPI AP may operate in, for example, the 5.925-6.425 GHz frequency band, the 6.425-6.525 GHz frequency band, the 6.525-6.875 GHz frequency band, or the 6.875-7.125 GHz frequency band, and may have a maximum EIRP of 24 dBm and/or a maximum EIRP PSD of −1 dBm/MHz. The LPI AP may be, for example, a BS 105 as discussed in relation to FIG. 1, and the client connected to the LPI AP may be, for example, a UE 115 as discussed in relation to FIG. 1. The maximum EIRP PSD of the client (e.g., UE 115) may be 6 dBm lower than the maximum EIRP PSD of the LPI AP (e.g., BS 105).

The BS 105 may transmit a SIB indicating a maximum transmit power of the BS 105 to the UE 115. In some aspects, the SIB may include a Pmax parameter indicating the maximum transmit power of the BS 105. The UE 115 may determine, based on the maximum transmit power indicated by the SIB, the maximum transmit power of the BS 105 and/or the maximum transmit power of the UE 115. The UE 115 may determine the maximum transmit power of the UE 115 by subtracting 6 dBm from the maximum transmit power of the BS 105. In some aspects, the BS 105 may configure a first UL transmission EIRP for a first UL BWP and a second UL transmission EIRP for a second UL BWP, where the second UL transmission EIRP is different from the first UL transmission EIRP. In some aspects, the BS 105 may configure a first UL transmission EIRP PSD for the first UL BWP and a second UL transmission EIRP PSD for the second UL BWP, where the second EIRP PSD is different from the first EIRP PSD.

Figure 3:
FIG. 3 illustrates a wireless communication network according to one or more aspects of the present disclosure.
Figure 3:
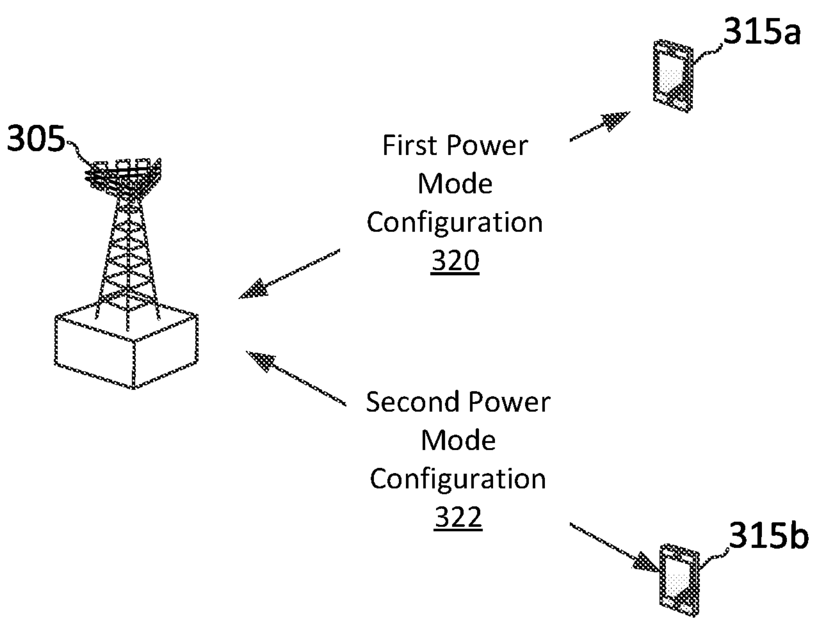

In some aspects, the BS 105 may dynamically switch between the first and the second power mode configurations. FIG. 3 illustrates a wireless communication network 300 according to one or more aspects of the present disclosure. The wireless communication network 300 may be incorporated in the network 100. The network 300 may include a BS 305, a UE 315*a*, and a UE 315*b*. The BS 305 may correspond to the BS 105 in FIG. 1, and the UEs 315*a* and 315*b* may correspond to the UEs 115 in FIG. 1.

In the example illustrated in FIG. 3, the BS 305 may transmit a first power mode configuration 320 to the UE 315*a* and may transmit a second power mode configuration 322 to the UE 315*b*. In some aspects, the BS 305 may dynamically switch between the first power mode configuration 320 and the second power mode configuration 322, but not per UE. For instance, the BS 305 may serve the UE 315*a* in the first power mode configuration 320 and may serve the UE 315*b* in the second power mode configuration 322 but does not dynamically switch between the first power mode configuration 320 and the second power mode configuration 322 for one UE. The BS 305 may, for instance, transmit a first RRC message indicating the first power mode configuration 320 to the UE 315*a* and transmit a second RRC message indicating the second power mode configuration 322 to the UE 315*b*.

Figure 4:
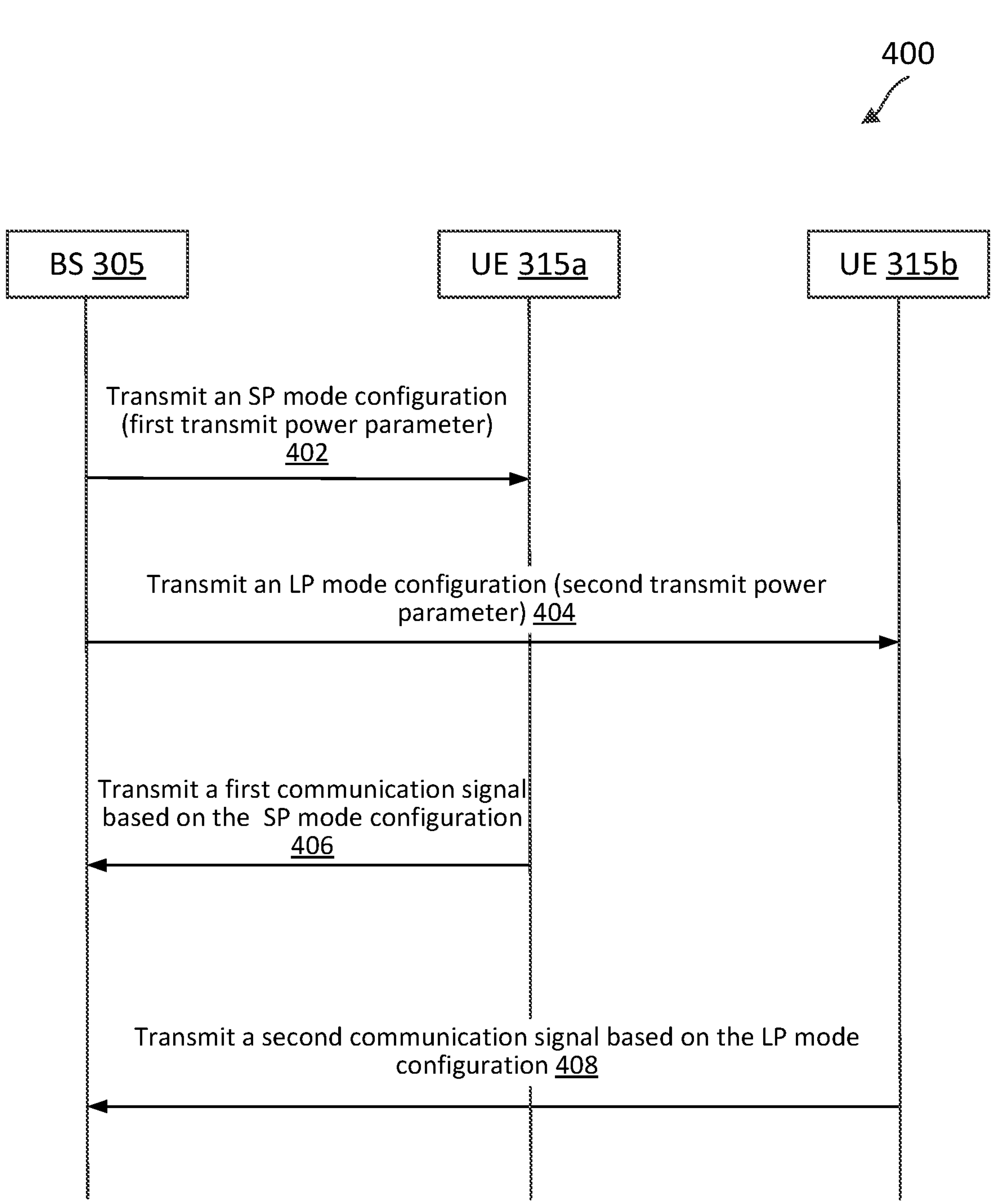
FIG. 4 is a signaling diagram illustrating a method of switching between a standard power (SP) mode configuration for a first user equipment (UE) and a low power (LP) mode configuration for a second UE according to one or more aspects of the present disclosure.
Figure 5:
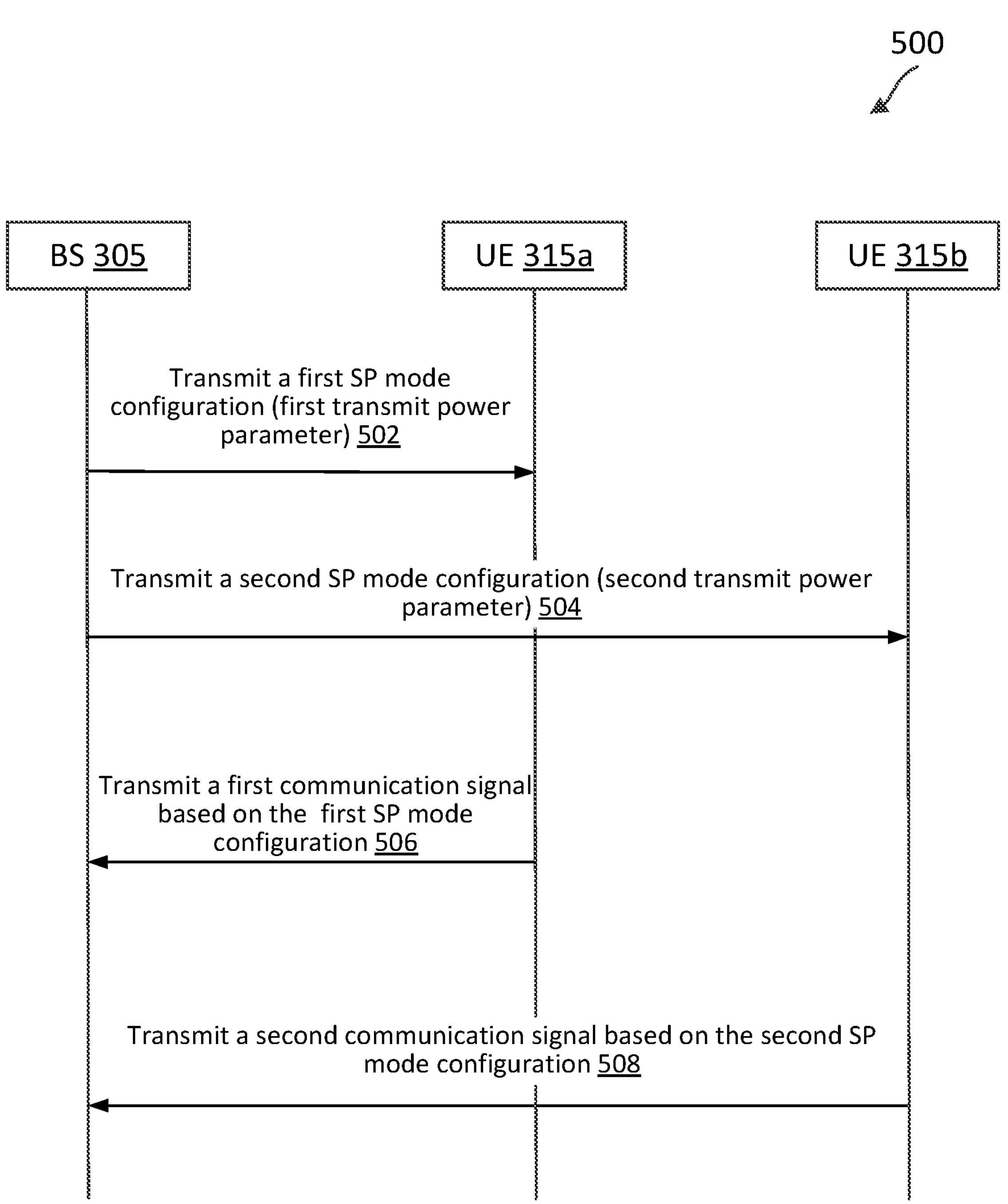
FIG. 5 is a signaling diagram illustrating a method of switching between a first SP mode configuration for a first UE and a second SP mode configuration for a second UE according to one or more aspects of the present disclosure.

As illustrated in FIG. 4, the first power mode configuration 320 may include an SP mode configuration corresponding to the UE 315*a*, and the second power mode configuration 322 may include an LP mode configuration corresponding to the UE 315*b* different from the UE 315*a*. As illustrated in FIG. 5, the first power mode configuration 320 may include a first SP mode configuration corresponding to the UE 315*a*, and the second power mode configuration 322 may include a second SP mode configuration different from the first SP mode configuration, where the second SP mode configuration corresponds to the UE 315*b* different from the UE 315*a*.

FIG. 4 is a signaling diagram illustrating a method 400 of switching between an SP mode configuration for the UE 315*a* and an LP mode configuration for the UE 315*b* according to one or more aspects of the present disclosure. The method 400 may be implemented between, for example, the BS 305, the UE 315*a*, and/or the UE 315*b* (e.g., located in the network 300 in FIG. 3). The method 400 may employ similar switching mechanisms as described with respect to FIG. 3 and may reuse the same parameter representations as described in the present disclosure. As illustrated, the method 400 includes a number of enumerated actions, but aspects of the method 400 may include additional actions before, after, and in between the enumerated actions. In some aspects, one or more of the enumerated actions may be omitted or performed in a different order from that shown in FIG. 4.

At an action 402 of the method 400, the BS 305 may transmit to the UE 315*a*, an SP mode configuration including a first transmit power parameter specific to the UE 315*a*. The SP mode configuration may correspond to the first power mode configuration 320 in FIG. 3. The BS 305 may, for instance, transmit a first RRC message indicating the SP mode configuration 320 to the UE 315*a*. The UE 315*a* may receive the SP mode configuration from the BS 305. The first transmit power parameter that is included in the SP mode configuration may be, for example, a maximum transmit power that is specific to the UE 315*a* or a maximum transmit PSD that is specific to the UE 315*a*.

At an action 404 of the method 400, the BS 305 may transmit to the UE 315*b*, an LP mode configuration including a second transmit power parameter specific to the UE 315*b*. The LP mode configuration may correspond to the second power mode configuration 322 in FIG. 3. The BS 305 may, for instance, transmit a second RRC message indicating the LP mode configuration 322 to the UE 315*b*. The UE 315*b* may receive the LP mode configuration from the BS 305. The second transmit power parameter that is included in the LP mode configuration may be, for example, a maximum transmit PSD that is specific to the UE 315*b*.

In some instances, the first transmit power parameter includes a first maximum transmit power that is specific to the UE 315*a* and may correspond to a first maximum transmit power of the BS 305. The second transmit power parameter includes a second maximum transmit that is specific to the UE 315*b* and may correspond to a second maximum transmit of the BS 305. Accordingly, the UE 315*a* may determine a maximum transmit power based on the first maximum transmit power that is specific to the UE 315*a* for the SP mode configuration. For instance, the UE 315*a* may configure its maximum transmit power to be about 6 dBm lower than the first maximum transmit power of the BS 305. Additionally or alternatively, the UE 315*b* may determine a maximum transmit power based on the second maximum transmit that is specific to the UE 315*b* for the LP mode configuration. For instance, the UE 315*b* may configure its transmit power to be about 6 dBm lower than the second maximum transmit of the BS 305.

In some instances, the first transmit power parameter includes a first maximum transmit PSD that is specific to the UE 315*a* and may correspond to a first maximum transmit PSD of the BS 305, and the second transmit power parameter includes a second maximum transmit PSD that is specific to the UE 315*b* and may be correspond to a second maximum transmit PSD of the BS 305. Accordingly, the UE 315*a* may determine a maximum transmit PSD to be about 6 dBm/MHz lower than the first maximum transmit PSD of the BS 305. Additionally or alternatively, the UE 315*b* may determine a maximum transmit PSD to be about 6 dBm/MHz lower than the second maximum transmit PSD of the BS 305.

In some instances, the BS 305 may include the UL maximum transmit power of the UE 315 (e.g., UE 315*a* or UE 315*b*) in DCI. For instance, the BS 305 may transmit a first DCI indicating the first power mode configuration (e.g., SP mode configuration) to the UE 315*a* and/or may transmit to a second DCI indicating the second power mode configuration (e.g., LP mode configuration) to the UE 315*b*. In an instance, the first transmit power parameter included in the first power mode configuration may include a first UL maximum transmit power of the UE 315*a*, and the second transmit power parameter included in the second power mode configuration may include a second UL maximum transmit power of the UE 315*b*. In another instance, the first transmit power parameter included in the first power mode configuration may include a first UL maximum transmit PSD of the UE 315*a*, and the second transmit power parameter included in the second power mode configuration may include a second UL maximum transmit PSD of the UE 315*b*.

In an instance, the BS 305 may transmit the first DCI in a first GC-PDCCH and may transmit the second DCI in a second GC-PDCCH different from the first GC-PDCCH. In another instance, the BS 305 may transmit the first DCI in a first UE-specific DCI indicating a grant including a first set of bits and/or may transmit the second DCI in a second UE-specific DCI indicating a grant including a second set of bits. The DCI grant may indicate an RB set that is scheduled. If there are bits in the RB set indication field that are not being used, the BS 305 may use the unused bits for indicating the first power mode configuration or the second power mode configuration. The first set of bits and/or the second set of bits may indicate whether to communicate a first communication signal based on the first power mode configuration or to communicate a second communication signal based on the second power mode configuration, as will be discussed further in relation to, for example, aspects of actions 406 and 408 below.

At an action 406 of the method 400, the UE 315*a* may transmit a first communication signal based on the SP mode configuration. For instance, the UE 315*a* may transmit the first communication signal in accordance with the first transmit power parameter (e.g., a maximum transmit power or a maximum transmit PSD determined by the UE 315*a* as discussed above) included in the SP mode configuration. The BS 305 may receive the first communication signal based on the SP mode configuration from the UE 315*a*.

At an action 408 of the method 400, the UE 315*b* may transmit a second communication signal based on the LP mode configuration. For instance, the UE 315*b* may transmit the second communication signal in accordance with the second transmit power parameter (e.g., a maximum transmit power or a maximum transmit PSD determined by the UE 315*b* as discussed above) included in the LP mode configuration. The BS 305 may receive the second communication signal based on the LP mode configuration from the UE 315*b*.

Although FIG. 4 describes the SP configuration and the LP configuration indicating a first transmit power or PSD of the BS and a second transmit power or PSD of the BS, it should be understood in other examples the SP configuration and the LP configuration may indicate a first transmit power or PSD of the UE and a second transmit power or PSD of the UE.

In some aspects, the BS 305 may switch between different SP mode configurations for a lower EIRP. For example, a standard or regulation (e.g., FCC regulation(s)) may specify that a maximum transmit power of the UE 315*a*, 315*b* sall be 6 dBm lower than a maximum transmit power of the BS 305. The BS 305 may dynamically switch between different maximum transmit powers of UEs 315*a* and 315, but not per UE.

The BS 305 may change the BW but may be unable to change the maximum transmit power of the UE 315*a*, 315*b*. The transmit power of the UE 315*a*, 315*b* may be determined by the worst-case transmit power of the BS 305 given the AFC information and transmission subband selection. The worst-case transmit power of the BS 305 may be indicated in the SIB when setting the maximum transmit power of the UE 315*a*, 315*b*.

FIG. 5 is a signaling diagram illustrating a method 500 of switching between a first SP mode configuration for the UE 315*a* and a second SP mode configuration for the UE 315*b* according to one or more aspects of the present disclosure. The method 500 may be implemented between, for example, the BS 305, the UE 315*a*, and/or the UE 315*b* (e.g., located in the network 300 in FIG. 3). The method 500 may employ similar switching mechanisms as described with respect to FIG. 3 and may reuse the same parameter representations as described in the present disclosure. As illustrated, the method 500 includes a number of enumerated actions, but aspects of the method 500 may include additional actions before, after, and in between the enumerated actions. In some aspects, one or more of the enumerated actions may be omitted or performed in a different order from that shown in FIG. 5.

At an action 502 of the method 500, the BS 305 may transmit to the UE 315*a*, a first SP mode configuration including a first transmit power parameter specific to the UE 315*a*. The first SP mode configuration may correspond to the first power mode configuration 320 in FIG. 3. The BS 305 may, for instance, transmit a first RRC message indicating the first SP mode configuration 320 to the UE 315*a*. The UE 315*a* may receive the first SP mode configuration from the BS 305. The first transmit power parameter that is included in the first SP mode configuration may be, for example, a maximum transmit power that is specific to the UE 315*a*.

At an action 504 of the method 500, the BS 305 may transmit to the UE 315*b*, a second SP mode configuration including a second transmit power parameter specific to the UE 315*b*. The second SP mode configuration may correspond to the second power mode configuration 322 in FIG. 3. The BS 305 may, for instance, transmit a second RRC message indicating the second SP mode configuration 322 to the UE 315*b*. The UE 315*b* may receive the second SP mode configuration from the BS 305. The second transmit power parameter that is included in the second SP mode configuration may be, for example, a maximum transmit power that is specific to the UE 315*b*.

In some instances, the first transmit power parameter includes a first maximum transmit power that is specific to the UE 315*a* and is based on a second maximum transmit power of the BS 305, and the second transmit power parameter includes a third maximum transmit power that is specific to the UE 315*b* and is based on the second maximum transmit power of the BS 305. Accordingly, the UE 315*a* may operate with the first maximum transmit power that is specific to the UE 315*a* for the first SP mode configuration, and the first maximum transmit power may be 6 dBm lower than the second maximum transmit power of the BS 305. Additionally or alternatively, the UE 315*b* may operate with the third maximum transmit power that is specific to the UE 315*b* for the second SP mode configuration, and the third maximum transmit power may be 6 dBm lower than the second maximum transmit power of the BS 305.

In some instances, the BS 305 may include the UL maximum transmit power of the UE 315 (e.g., UE 315*a* or UE 315*b*) in DCI. For instance, the BS 305 may transmit a first DCI indicating the first power mode configuration (e.g., the first SP mode configuration) to the UE 315*a* and/or may transmit to a second DCI indicating the second power mode configuration (e.g., the second SP mode configuration) to the UE 315*b*. In an instance, the first transmit power parameter included in the first power mode configuration may include a first UL maximum transmit power of the UE 315*a*, and the second transmit power parameter included in the second power mode configuration may include a second UL maximum transmit power of the UE 315*b*. In another instance, the first transmit power parameter included in the first power mode configuration may include a first UL maximum transmit PSD of the UE 315*a*, and the second transmit power parameter included in the second power mode configuration may include a second UL maximum transmit PSD of the UE 315*b*.

In an instance, the BS 305 may transmit the first DCI in a first GC-PDCCH and may transmit the second DCI in a second GC-PDCCH different from the first GC-PDCCH. In another instance, the BS 305 may transmit the first DCI in a first UE-specific DCI indicating a grant including a first set of bits and/or may transmit the second DCI in a second UE-specific DCI indicating a grant including a second set of bits. The DCI grant may indicate an RB set that is scheduled. If there are bits in the RB set indication field that are not being used, the BS 305 may use the unused bits for indicating the first power mode configuration or the second power mode configuration. The first set of bits and/or the second set of bits may indicate whether to communicate a first communication signal based on the first power mode configuration or to communicate a second communication signal based on the second power mode configuration, as will be discussed further in relation to, for example, aspects of actions 506 and 508 below.

At an action 506 of the method 500, the UE 315*a* may transmit a first communication signal based on the first SP mode configuration. For instance, the UE 315*a* may transmit the first communication signal in accordance with the first transmit power parameter included in the first SP mode configuration. For instance, the UE 315*a* may configure its transmit power to be about 6 dBm lower than the first transmit power parameter. Alternatively, the UE 315*a* may configure its transmit PSD to be about 6 dBm/MHz lower than the first transmit power parameter. The BS 305 may receive the first communication signal based on the first SP mode configuration from the UE 315*a*.

At an action 508 of the method 500, the UE 315*b* may transmit a second communication signal based on the second SP mode configuration. For instance, the UE 315*b* may transmit the second communication signal in accordance with the second transmit power parameter included in the second SP mode configuration. For instance, the UE 315*b* may configure its transmit power to be about 6 dBm lower than the first transmit power parameter. Alternatively, the UE 315*b* may configure its transmit PSD to be about 6 dBm/MHz lower than the first transmit power parameter. The BS 305 may receive the second communication signal based on the second SP mode configuration from the UE 315*b*.

In some aspects, the BS 305 may configure a first UL BWP for the first SP mode configuration and configure a second UL BWP for the second SP mode configuration. The first transmit power parameter included in the first SP mode configuration may include a first UL maximum transmit power of the UE 315*a*, and the BS 305 may use a first DL maximum transmit power when communicating with the UE 315*a*. Additionally or alternatively, the second transmit power parameter included in the second SP mode configuration may include a second UL maximum transmit power of the UE 315*b*, and the BS 305 may use a second DL maximum transmit power when communicating with the UE 315*b*. In some instances, the first UL maximum transmit power is different from the second UL maximum transmit power. In some instances, the first DL maximum transmit power is different from the second DL maximum transmit power.

Although FIG. 5 describes the first SP configuration and the second SP configuration indicating a first transmit power or PSD of the BS and a second transmit power or PSD of the BS, it should be understood in other examples the first SP configuration and the second SP configuration may indicate a first transmit power or PSD of the UE and a second transmit power or PSD of the UE.

Although FIGS. 3-5 illustrate the BS 305 communicating with the UE 315*a* for a first power mode configuration and communicating with the UE 315*b* for a second power mode configuration, this is not intended to be limiting, and the BS 305 may communicate with a single UE for both the first and second mode configurations.

Figure 6:
FIG. 6 illustrates a wireless communication network according to one or more aspects of the present disclosure.
Figure 6:
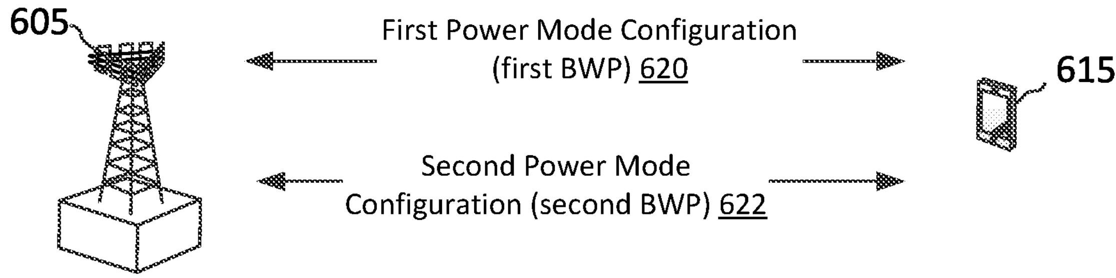

FIG. 6 illustrates a wireless communication network 600 according to one or more aspects of the present disclosure. The wireless communication network 600 may be incorporated in the network 100. The network 600 may include a BS 605 and a UE 615. The BS 605 may correspond to the BS 105 in FIG. 1, and the UE 615 may correspond to the UE 115 in FIG. 1.

In the example illustrated in FIG. 6, the BS 605 may transmit a first power mode configuration 620 and a second power mode configuration 622 to the UE 615. In some aspects, the BS 605 may dynamically switch between the first power mode configuration 620 and the second power mode configuration 622, per UE. For instance, the BS 605 may serve the UE 615 in the first power mode configuration 620 and in the second power mode configuration 622 and may dynamically switch between the first power mode configuration 620 and the second power mode configuration 622 for the UE 615.

The BS 605 may transmit to the UE 615, a first DL communication signal during a first time period based on the first power mode configuration 620 and/or may transmit a second DL communication signal during a second time period based on the second power mode configuration 622, where the second time period is different from the first time period. For instance, the BS 605 may transmit the first DL communication signal in accordance with a first maximum transmit power of the BS 605 and/or a first maximum transmit PSD of the BS 605. The UE 115 may receive the first communication signal and/or the second communication signal from the BS 605.

Additionally or alternatively, the UE 615 may transmit a first UL communication signal during a first time period based on the first power mode configuration 620 and/or may transmit a second UL communication signal during a second time period based on the second power mode configuration 622, where the second time period is different from the first time period. For instance, the UE 615 may transmit the first UL communication signal in accordance with a first maximum transmit power of the UE 615 and/or a first maximum transmit PSD of the UE 115. The BS 605 may receive the first communication signal and/or the second communication signal from the UE 615.

Figure 7:
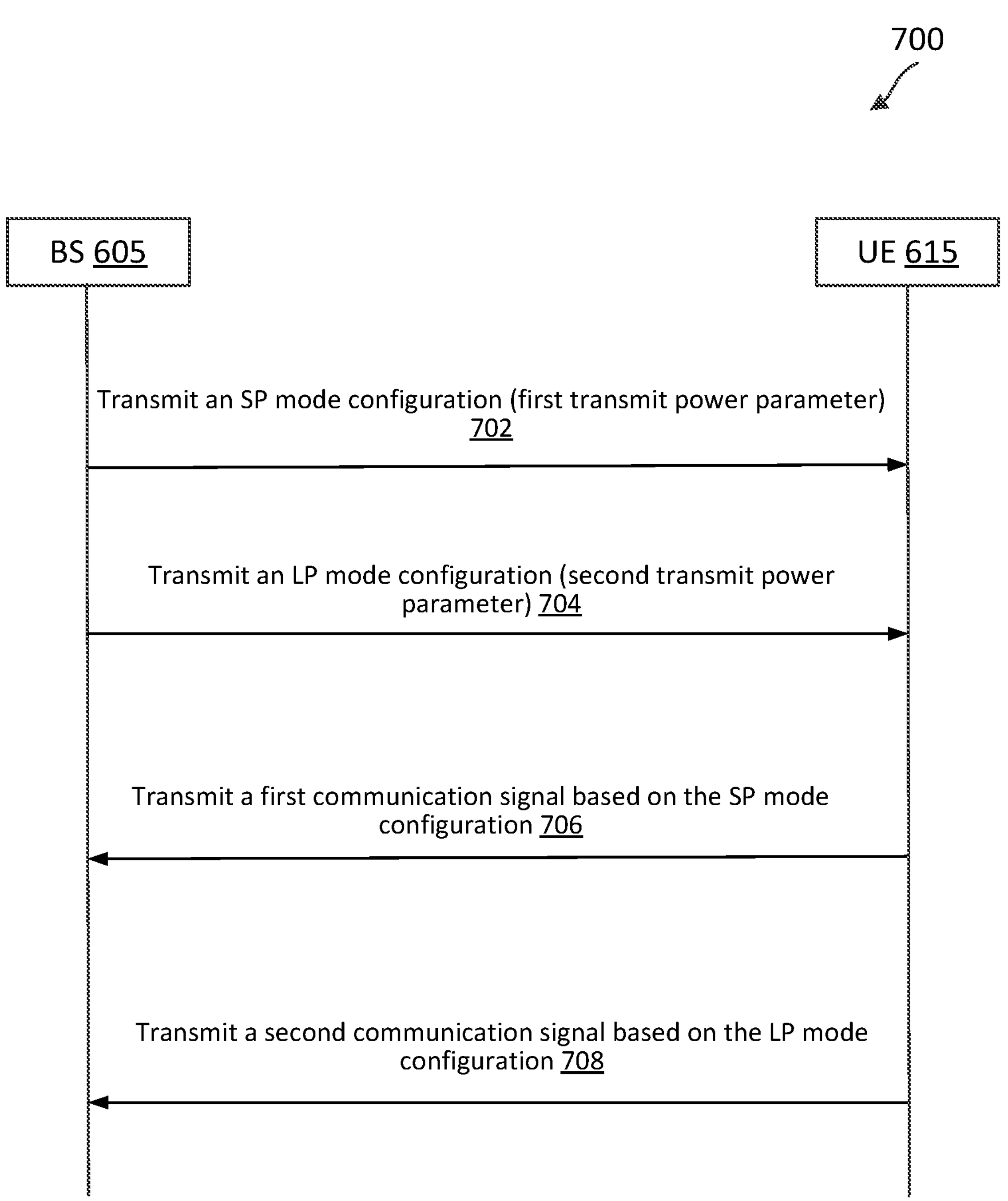
FIG. 7 is a signaling diagram illustrating a method of switching between an SP mode configuration and an LP mode configuration, where the SP and LP mode configurations correspond to the same UE according to one or more aspects of the present disclosure.
Figure 8:
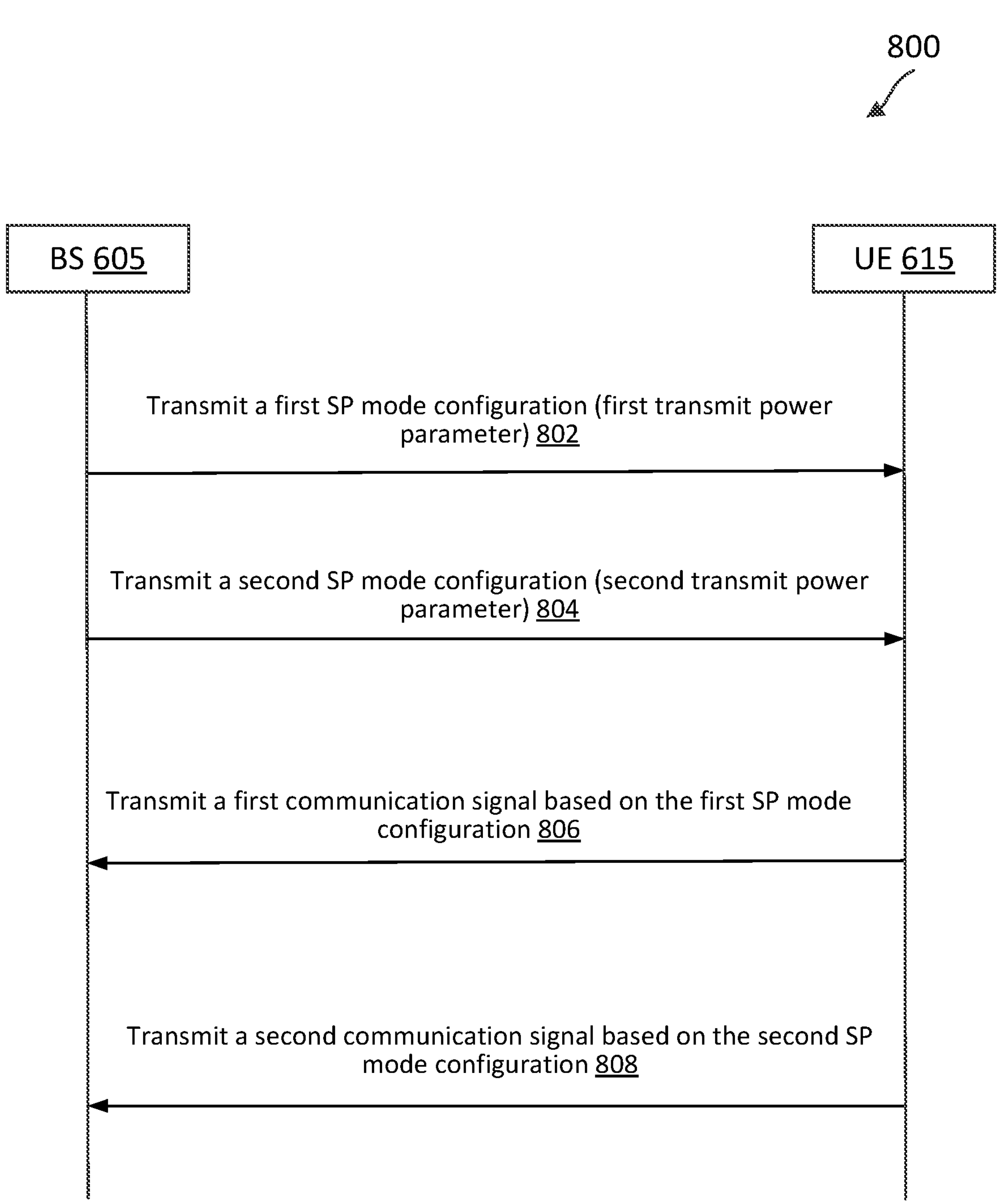
FIG. 8 is a signaling diagram illustrating a method of switching between a first SP mode configuration and a second SP mode configuration for the same UE according to one or more aspects of the present disclosure.

As will be discussed in more detail below relative to aspects of, for example, FIGS. 7 and 8, the first power mode configuration 620 may be associated with a first BWP and the second power mode configuration 622 may be associated with a second BWP. The second BWP may be the same as or different from the first BWP. Additionally, as illustrated in FIG. 7, the first power mode configuration 620 may include an SP mode configuration, and the second power mode configuration 622 may include an LP mode configuration, where the SP mode configuration and the LP mode configuration are configured for the same UE 615. As illustrated in FIG. 8, the first power mode configuration 620 may include a first SP mode configuration, and the second power mode configuration 622 may include a second SP mode configuration different from the first SP mode configuration, where the first and second SP mode configurations are configured for the same UE 615.

Although FIG. 6 describes the first SP configuration and the second SP configuration indicating a first transmit power or PSD of the BS and a second transmit power or PSD of the BS, it should be understood in other examples the first SP configuration and the second SP configuration may indicate a first transmit power or PSD of the UE and a second transmit power or PSD of the UE.

FIG. 7 is a signaling diagram illustrating a method 700 of switching between an SP mode configuration and an LP mode configuration, where the SP and LP mode configurations correspond to the same UE 615 according to one or more aspects of the present disclosure. The method 700 may be implemented between, for example, the BS 605 and the UE 615 (e.g., located in the network 600 in FIG. 6). The method 700 may employ similar switching mechanisms as described with respect to FIG. 6 and may reuse the same parameter representations as described in the present disclosure. As illustrated, the method 700 includes a number of enumerated actions, but aspects of the method 700 may include additional actions before, after, and in between the enumerated actions. In some aspects, one or more of the enumerated actions may be omitted or performed in a different order from that shown in FIG. 7.

At an action 702 of the method 700, the BS 605 may transmit to the UE 615, an SP mode configuration including a first transmit power parameter specific to the UE 615. The SP mode configuration may correspond to the first power mode configuration 620 in FIG. 6. In some instances, the BS 605 may transmit the SP mode configuration to the UE 615 in a first RRC configuration. In some instances, the BS 605 may transmit the SP mode configuration to the UE 615 in a first UE-specific RRC configuration. The UE 615 may receive the SP mode configuration from the BS 605. The first transmit power parameter that is included in the SP mode configuration may be, for example, a maximum transmit power that is specific to the UE 615 or a maximum transmit PSD that is specific to the UE 615.

At an action 704 of the method 700, the BS 605 may transmit to the UE 615, an LP mode configuration including a second transmit power parameter specific to the UE 615. The LP mode configuration may correspond to the second power mode configuration 622 in FIG. 6. In some instances, the BS 605 may transmit the LP mode configuration to the UE 615 in a second RRC configuration. In some instances, the BS 605 may transmit the LP mode configuration to the UE 615 in a second UE-specific RRC configuration. The UE 615 may receive the LP mode configuration from the BS 605. The second transmit power parameter that is included in the LP mode configuration may be, for example, a maximum transmit PSD that is specific to the UE 615.

In some instances, the BS 605 may configure a first UL maximum transmit power of the UE 615 for the first transmit power parameter of the SP mode configuration and may configure a second UL maximum transmit power of the UE 615 for the second transmit power parameter of the LP mode configuration. In some instances, the BS 605 may configure a first UL maximum transmit PSD of the BS 605 for the first transmit power parameter of the SP mode configuration and may configure a second UL maximum transmit PSD of the BS 605 for the second transmit power parameter of the LP mode configuration.

In some aspects, the BS 605 may transmit the SP mode configuration by transmitting a first BWP switch configuration for switching from a second UL BWP to a first UL BWP, where the first UL BWP is associated with the SP mode configuration and the second UL BWP is associated with the LP mode configuration. The first BWP switch configuration may include the SP mode configuration. The BS 605 may also transmit the LP mode configuration by transmitting a second BWP switch configuration for switching from the first UL BWP to the second UL BWP. The second BWP switch configuration may include the LP mode configuration.

In some instances, the BS 605 may include the UL maximum transmit power of the UE 615 in DCI. For instance, the BS 605 may transmit a first DCI indicating the first power mode configuration (e.g., SP mode configuration) to the UE 315 and/or may transmit a second DCI indicating the second power mode configuration (e.g., LP mode configuration) to the UE 315. In an instance, the first transmit power parameter included in the first power mode configuration may include a first UL maximum transmit power of the UE 315, and the second transmit power parameter included in the second power mode configuration may include a second UL maximum transmit power of the UE 315. In another instance, the first transmit power parameter included in the first power mode configuration may include a first UL maximum transmit PSD of the UE 315, and the second transmit power parameter included in the second power mode configuration may include a second UL maximum transmit PSD of the UE 315.

In an instance, the BS 305 may transmit the first DCI in a first GC-PDCCH and may transmit the second DCI in a second GC-PDCCH different from the first GC-PDCCH. In another instance, the BS 305 may transmit the first DCI in a first UE-specific DCI indicating a grant including a first set of bits and/or may transmit the second DCI in a second UE-specific DCI indicating a grant including a second set of bits. The DCI grant may indicate an RB set that is scheduled. If there are bits in the RB set indication field that are not being used, the BS 305 may use the unused bits for indicating the first power mode configuration or the second power mode configuration. The first set of bits and/or the second set of bits may indicate whether to communicate a first communication signal based on the first power mode configuration or to communicate a second communication signal based on the second power mode configuration, as will be discussed further in relation to, for example, aspects of actions 706 and 708 below.

At an action 706 of the method 700, the UE 615 may transmit a first communication signal based on the SP mode configuration. For instance, the UE 615 may transmit the first communication signal in accordance with the first transmit power parameter included in the SP mode configuration. For instance, the UE 615 may configure its transmit power to be about 6 dBm lower than the first transmit power parameter. Alternatively, the UE 615 may configure its transmit PSD to be about 6 dBm/MHz lower than the first transmit power parameter. The BS 605 may receive the first communication signal based on the SP mode configuration from the UE 615.

At an action 708 of the method 700, the UE 615 may transmit a second communication signal based on the LP mode configuration. For instance, the UE 615 may transmit the second communication signal in accordance with the second transmit power parameter included in the LP mode configuration. For instance, the UE 615 may configure its transmit power to be about 6 dBm lower than the second transmit power parameter. Alternatively, the UE 615 may configure its transmit PSD to be about 6 dBm/MHz lower than the second transmit power parameter. The BS 605 may receive the second communication signal based on the LP mode configuration from the UE 615.

In some aspects, the first and second communication signals may be UL communication signals. For instance, the UE 615 may transmit a first UL communication signal in the first UL BWP based on the SP mode configuration and/or may transmit a second UL communication signal in the second UL BWP based on the LP mode configuration. The BS 605 may receive the first UL communication signal in the first UL BWP based on the SP mode configuration and/or may receive the second UL communication signal in the second UL BWP based on the LP mode configuration.

Although FIG. 7 describes the SP configuration and the LP configuration indicating a first transmit power or PSD of the BS and a second transmit power or PSD of the BS, it should be understood in other examples the SP configuration and the LP configuration may indicate a first transmit power or PSD of the UE and a second transmit power or PSD of the UE.

In some aspects, the BS 605 may switch between different SP mode configurations for a lower EIRP. For example, a standard or regulation (e.g., Federal Communications Commission (FCC) regulation(s)) may specify that a maximum transmit power of the UE 615 shall be 6 dBm lower than a maximum transmit power of the BS 605. The BS 605 may dynamically switch between different maximum DL transmit powers as a function of subband usage and allow the UE 615 to use different maximum transmit powers per BWP and/or different maximum transmit PSDs per BWP.

FIG. 8 is a signaling diagram illustrating a method 800 of switching between a first SP mode configuration for the UE 615 and a second SP mode configuration for the UE 615 according to one or more aspects of the present disclosure. The method 800 may be implemented between, for example, the BS 605 and the UE 615 (e.g., located in the network 600 in FIG. 6). The method 600 may employ similar switching mechanisms as described with respect to FIG. 6 and may reuse the same parameter representations as described in the present disclosure. As illustrated, the method 800 includes a number of enumerated actions, but aspects of the method 800 may include additional actions before, after, and in between the enumerated actions. In some aspects, one or more of the enumerated actions may be omitted or performed in a different order from that shown in FIG. 8.

At an action 802 of the method 800, the BS 605 may transmit to the UE 615, a first SP mode configuration including a first transmit power parameter specific to the UE 615. The first SP mode configuration may correspond to the first power mode configuration 620 in FIG. 6. In some instances, the BS 605 may transmit the first SP mode configuration to the UE 615 in a first RRC configuration. In some instances, the BS 605 may transmit the first SP mode configuration to the UE 615 in a first UE-specific RRC configuration. The UE 615 may receive the first SP mode configuration from the BS 605. The first transmit power parameter that is included in the first SP mode configuration may be, for example, a maximum transmit power that is specific to the UE 615 or a maximum transmit PSD that is specific to the UE 615.

At an action 804 of the method 800, the BS 605 may transmit to the UE 615, a second SP mode configuration including a second transmit power parameter specific to the UE 615. The second SP mode configuration may correspond to the second power mode configuration 622 in FIG. 6. In some instances, the BS 605 may transmit the second SP mode configuration to the UE 615 in a second RRC configuration. In some instances, the BS 605 may transmit the second SP mode configuration to the UE 615 in a second UE-specific RRC configuration. The UE 615 may receive the second SP mode configuration from the BS 605. The second transmit power parameter that is included in the second SP mode configuration may be, for example, a maximum transmit power that is specific to the UE 615 or a maximum transmit PSD that is specific to the UE 615.

In some instances, the BS 605 may configure a first UL maximum transmit power of the UE 615 for the first transmit power parameter of the first SP mode configuration and may configure a second UL maximum transmit power of the UE 615 for the second transmit power parameter of the second SP mode configuration. In some instances, the BS 605 may configure a first UL maximum transmit PSD of the UE 615 for the first transmit power parameter of the first SP mode configuration and may configure a second UL maximum transmit PSD of the UE 615 for the second transmit power parameter of the second SP mode configuration.

In some aspects, the BS 605 may configure a first UL BWP for the first SP mode configuration and may configure a second UL BWP for the second SP mode configuration. The first transmit power parameter may be a first UL maximum transmit power of the UE 615, and the BS 605 may use a first DL maximum transmit power. The second transmit power parameter may be a second UL maximum transmit power of the UE 615, and the BS using a second DL maximum transmit power. The first DL maximum transmit power may be different from the second DL maximum transmit power. Additionally or alternatively, the first UL BWP for the first SP mode configuration may be different from the second UL BWP for the second SP mode configuration. For instance, the first UL BWP and the second UL BWP may include a different amount of frequency bandwidths, and the first transmit power parameter and the second transmit power parameter may indicate a same maximum transmit power of the UE 615.

In some aspects, the BS 605 may transmit the first SP mode configuration by transmitting a first BWP switch configuration for switching from a second UL BWP to a first UL BWP, where the first UL BWP is associated with the first SP mode configuration and the second UL BWP is associated with the second SP mode configuration. The first BWP switch configuration may include the first SP mode configuration. The BS 605 may also transmit the second SP mode configuration by transmitting a second BWP switch configuration for switching from the first UL BWP to the second UL BWP. The second BWP switch configuration may include the second SP mode configuration.

In some instances, the BS 605 may include the UL maximum transmit power of the UE 615 in DCI. For instance, the BS 605 may transmit a first DCI indicating the first power mode configuration (e.g., a first SP mode configuration) to the UE 315 and/or may transmit a second DCI indicating the second power mode configuration (e.g., a second SP mode configuration) to the UE 315. In an instance, the first transmit power parameter included in the first power mode configuration may include a first UL maximum transmit power of the UE 315, and the second transmit power parameter included in the second power mode configuration may include a second UL maximum transmit power of the UE 315. In another instance, the first transmit power parameter included in the first power mode configuration may include a first UL maximum transmit PSD of the UE 315, and the second transmit power parameter included in the second power mode configuration may include a second UL maximum transmit PSD of the UE 315.

In an instance, the BS 305 may transmit the first DCI in a first GC-PDCCH and may transmit the second DCI in a second GC-PDCCH different from the first GC-PDCCH. In another instance, the BS 305 may transmit the first DCI in a first UE-specific DCI indicating a grant including a first set of bits and/or may transmit the second DCI in a second UE-specific DCI indicating a grant including a second set of bits. The DCI grant may indicate an RB set that is scheduled. If there are bits in the RB set indication field that are not being used, the BS 305 may use the unused bits for indicating the first power mode configuration or the second power mode configuration. The first set of bits and/or the second set of bits may indicate whether to communicate a first communication signal based on the first power mode configuration or to communicate a second communication signal based on the second power mode configuration, as will be discussed further in relation to, for example, aspects of actions 806 and 808 below.

At an action 806 of the method 800, the UE 615 may transmit a first communication signal based on the first SP mode configuration. For instance, the UE 615 may transmit the first communication signal in accordance with the first transmit power parameter (e.g., a maximum transmit power or a maximum transmit PSD) included in the first SP mode configuration. For instance, the UE 615 may configure its transmit power to be about 6 dBm lower than the first transmit power parameter. Alternatively, the UE 615 may configure its transmit PSD to be about 6 dBm/MHz lower than the first transmit power parameter. The BS 605 may receive the first communication signal based on the first SP mode configuration from the UE 615.

At an action 808 of the method 800, the UE 615 may transmit a second communication signal based on the second SP mode configuration. For instance, the UE 615 may transmit the second communication signal in accordance with the second transmit power parameter (e.g., a maximum transmit PSD) included in the second SP mode configuration. For instance, the UE 615 may configure its transmit power to be about 6 dBm lower than the second transmit power parameter. Alternatively, the UE 615 may configure its transmit PSD to be about 6 dBm/MHz lower than the second transmit power parameter. The BS 605 may receive the second communication signal based on the second SP mode configuration from the UE 615.

In some aspects, the first and second communication signals may be UL communication signals. For instance, the UE 615 may transmit a first UL communication signal in the first UL BWP based on the first SP mode configuration and/or may transmit a second UL communication signal in the second UL BWP based on the second SP mode configuration. The BS 605 may receive the first UL communication signal in the first UL BWP based on the first SP mode configuration and/or may receive the second UL communication signal in the second UL BWP based on the second SP mode configuration.

Although FIG. 8 describes the first SP configuration and the second SP configuration indicating a first transmit power or PSD of the BS and a second transmit power or PSD of the BS, it should be understood in other examples the first SP configuration and the second SP configuration may indicate a first transmit power or PSD of the UE and a second transmit power or PSD of the UE.

In some aspects, the BS 605 may switch between different SP mode configurations for a lower PSD. For example, a standard or regulation (e.g., Federal Communications Commission (FCC) regulation(s)) may specify that a maximum transmit PSD of the UE 615 shall be 6 dBm lower than a maximum transmit PSD per MHz of the BS 605.

Figure 9:
FIG. 9 illustrates a subband configuration of an uplink (UL) power spectral density (PSD) according to one or more aspects of the present disclosure.
Figure 9:
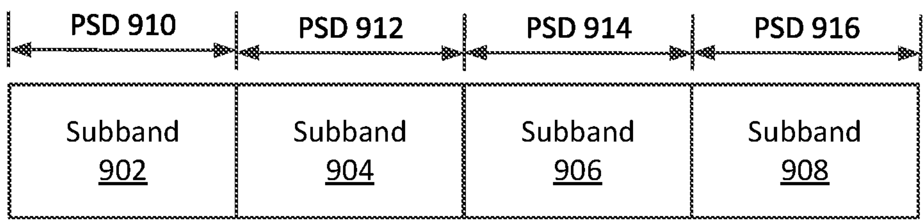

FIG. 9 illustrates a subband configuration 900 of an UL PSD according to one or more aspects of the present disclosure. The subband configuration 900 may be employed by, for example, the BS 105 and/or the UE 115 in FIG. 1, the BS 305, the UE 315*a*, and/or the UE 315*b* in FIGS. 3-5, and/or the BS 605 and/or the UE 615 in FIGS. 6-8. The subband configuration 900 may be used in a worst-case per subband configuration of an UL PSD. In the example illustrated in FIG. 9, the BS 105 may configure the separated UL PSD per UL subband. For instance, the BS 105 may configure a PSD 910 for a subband 902, a PSD 912 for a subband 904, a PSD 914 for a subband 906, and a PSD 916 fora subband 908. Each of the PSDs 910, 912, 914, and 916 may be the same or different from each other. Depending on the different UL BWP being used, the PSD may be different.

Figure 10:
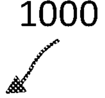
FIG. 10 illustrates an UL bandwidth part (BWP) dependent configuration of PSD according to one or more aspects of the present disclosure.
Figure 10:
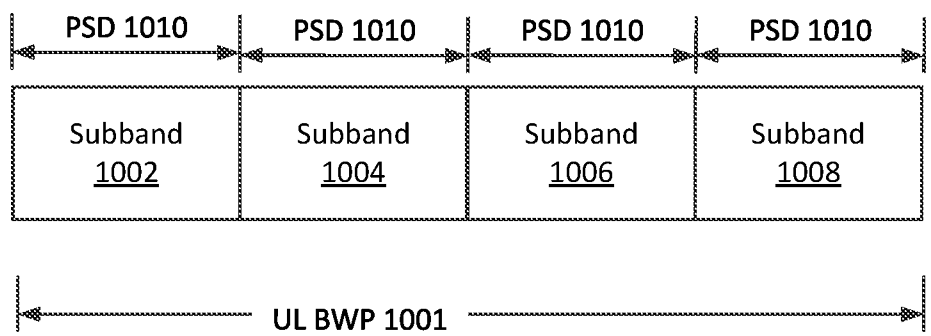

FIG. 10 illustrates an UL BWP dependent configuration 1000 of PSD according to one or more aspects of the present disclosure. The UL BWP dependent configuration 1000 may be employed by, for example, the BS 105 and/or the UE 115 in FIG. 1, the BS 305, the UE 315*a*, and/or the UE 315*b* in FIGS. 3-5, and/or the BS 605 and/or the UE 615 in FIGS. 6-8.

In the example illustrated in FIG. 10, an UL BWP 1001 includes a subband 1002, a subband 1004, a subband 1006, and a subband 1008. As illustrated in FIG. 10, in some aspects, the BS 105 may configure a single PSD 1010 for all subbands 1002, 1004, 1006, and 1008 in the UL BWP 1001. A first transmit power parameter included in a first power mode configuration may include a first maximum transmit PSD of the UE 115 for all subbands within the UL BWP 1001, and a second transmit power parameter included in a second power mode configuration may include a second maximum transmit PSD of the UE 115 for all subbands within the UL BWP 1001. In some instances, the first power mode configuration includes the SP mode configuration, and the second power mode configuration includes the LP mode configuration. In some instances, the first power mode configuration includes a first SP mode configuration, and the second power mode configuration includes a second SP mode configuration different from the first SP mode configuration.

In other aspects, the BS 105 may configure a single PSD per subband in the UL BWP 1001 (not shown). A first transmit power parameter included in a first power mode configuration may include a first maximum transmit PSD for a first subband within a first UL BWP and a second maximum transmit PSD for a second subband within the first UL BWP, where the first subband may be different from the first subband. Additionally or alternatively, the second transmit power parameter included in a second power mode configuration may include a third maximum transmit PSD for a third subband within a second UL BWP and a fourth maximum transmit PSD for a fourth subband within the second UL BWP, where the third subband may be different from the fourth subband.

Figure 11:
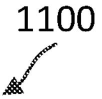
FIG. 11 illustrates a wireless communication network according to one or more aspects of the present disclosure.
Figure 11:
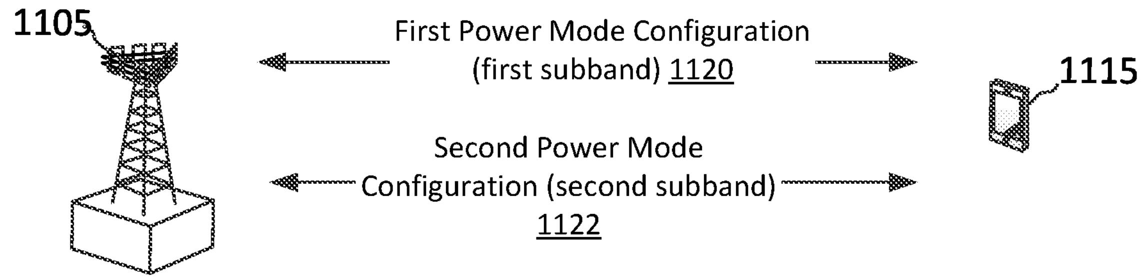

In some aspects, the BS 105 and the UE 115 may operate in a first subband with an SP mode configuration and may operate in a second subband with an LP mode configuration. In other words, the BS 105 and the UE 115 may operate in the SP mode configuration and the LP mode configuration for different subbands, as shown in FIG. 11. FIG. 11 illustrates a wireless communication network 1100 according to one or more aspects of the present disclosure. The wireless communication network 1100 may be incorporated in the network 100. The network 1100 may include a BS 1105 and a UE 1115. The BS 1105 may correspond to the BS 105 in FIG. 1, and the UE 1115 may correspond to the UE 115 in FIG. 1.

In the example illustrated in FIG. 11, the BS 1105 may transmit a first power mode configuration 1120 associated with a first subband and a second power mode configuration 1122 associated with a second subband to the UE 1115. In some aspects, the BS 1105 may dynamically switch between the first power mode configuration 1120 and the second power mode configuration 1122, per UE. For instance, the BS 1105 may serve the UE 1115 in the first power mode configuration 1120 and in the second power mode configuration 1122 and may dynamically switch between the first power mode configuration 1120 and the second power mode configuration 622 for the UE 1115. Accordingly, the UE 1115 may determine its transmit power or transmit PSD for a transmission in the first subband based on a first transmit power parameter indicated by the first power mode configuration 1120 and may determine its transmit power or transmit PSD for a transmission in the second subband based on a first transmit power parameter indicated by the second power mode configuration 1122. If the allocation crosses multiple subbands, the BS 1105 and the UE 1115 may use a minimum PSD across the allocated subbands.

The BS 1105 may transmit the first and second power mode configurations to the UE 1115 in a variety of ways. In some aspects, the BS 1105 may transmit the first power mode configuration 1120 to the UE 1115 by transmitting a first BWP switch configuration for switching from the second UL BWP to the first UL BWP and/or may transmit the second power mode configuration 1122 to the UE 1115 by transmitting a second BWP switch configuration for switching from the first UL BWP to the second UL BWP. The first BWP switch configuration may include the first power mode configuration 1120, and the second BWP switch configuration may include the second power mode configuration 1122. The UE 1115 may receive the first power mode configuration 1120 and the second power mode configuration 1122 from the BS 1105.

In some aspects, the BS 1105 may transmit the first power mode configuration 1120 to the UE 1115 by transmitting the first power mode configuration 1120 in a first RRC configuration and/or may transmit the second power mode configuration 1122 to the UE 1115 by transmitting the second power mode configuration 1122 in a second RRC configuration. The BS 1105 may configure the power mode configuration per subband PSD limitation. The UE 1115 may apply different PSD limitations based on the UL transmission location. The first RRC configuration and/or the second RRC configuration may be BWP dependent.

In some aspects, the BS 1105 may transmit the first power mode configuration 1120 to the UE 1115 by transmitting the first power mode configuration 1120 in a first UE-specific RRC configuration and/or may transmit the second power mode configuration 1122 by transmitting the second power mode configuration 1122 in a second UE-specific RRC configuration.

In some aspects, the BS 1105 may transmit the first power mode configuration 1120 to the UE 1115 by transmitting the first power mode configuration 1120 in a first DCI indicating the first power mode configuration and/or may transmit the second power mode configuration 1122 to the UE 1115 by transmitting the second power mode configuration 1122 in a second DCI indicating the second power mode configuration. In an instance, the BS 1105 may transmit the DCI (e.g., the first DCI, second DCI, etc.) by transmitting the DCI in a GC-PDCCH. In another instance, the BS 1105 may transmit the DCI (e.g., the first DCI, second DCI, etc.) by transmitting the DCI in a UE-specific DCI indicating a grant including a set of bits. The set of bits may indicate to the UE 1115 whether to communicate a first communication signal based on the first power mode configuration 1120 or to communicate a second communication signal based on the second power mode configuration 1122.

Although FIG. 11 describes the SP configuration and the LP configuration indicating a first transmit power or PSD of the BS and a second transmit power or PSD of the BS, it should be understood in other examples the SP configuration and the LP configuration may indicate a first transmit power or PSD of the UE and a second transmit power or PSD of the UE.

Figure 12:
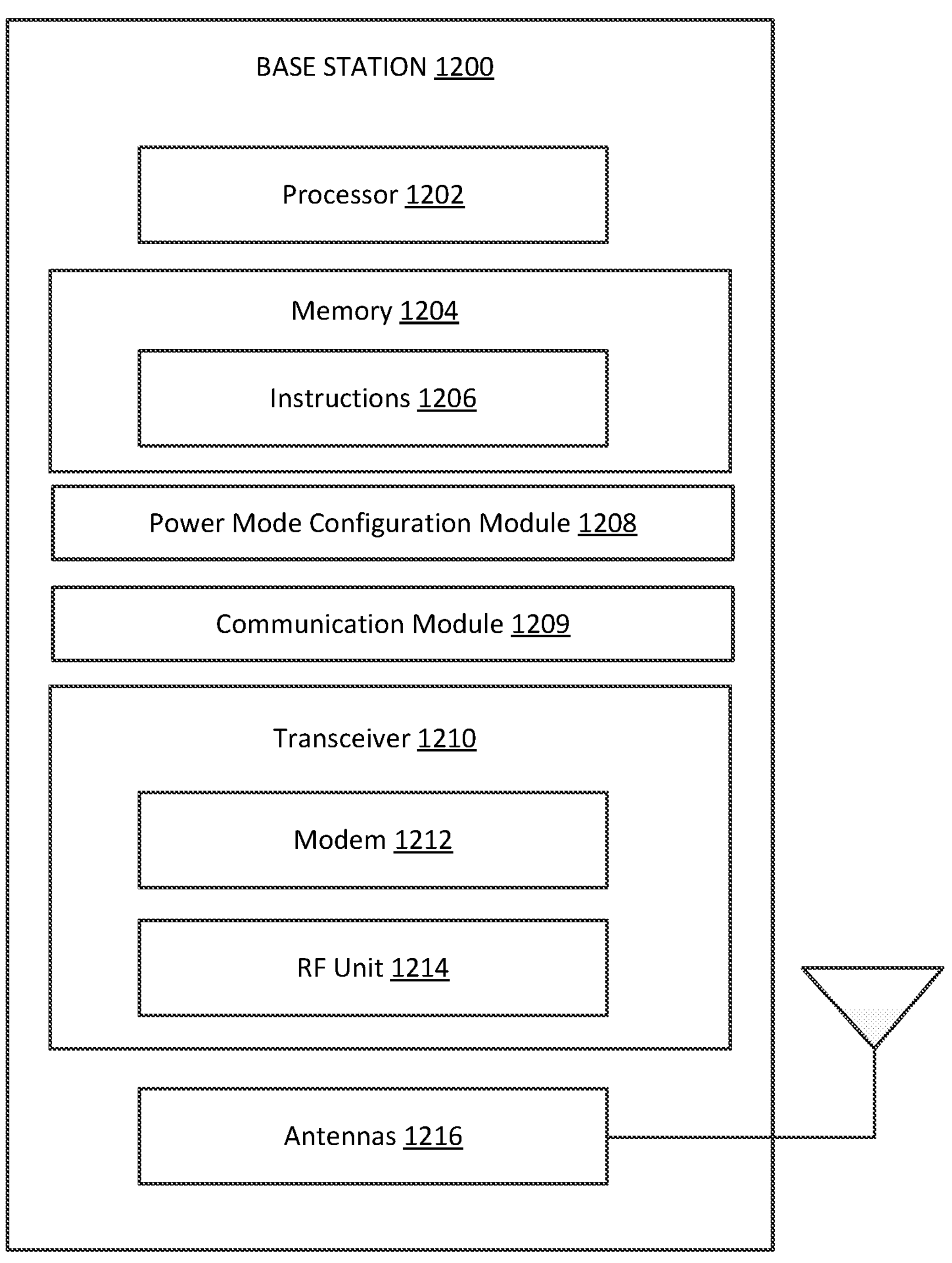
FIG. 12 is a block diagram of an example UE according to one or more aspects of the present disclosure.

FIG. 12 is a block diagram of a BS 1200 according to one or more aspects of the present disclosure. The BS 1200 may be a BS 105 as discussed in relation to FIG. 1, a BS 305 as discussed in relation to FIG. 3, a BS 605 as discussed in relation to FIG. 6, or a BS 1105 as discussed in relation to FIG. 11. As shown, the BS 1200 may include a processor 1202, a memory 1204, a power mode configuration module 1208, a communication module 1209, a transceiver 1210 including a modem subsystem 1212 and a radio frequency (RF) unit 1214, and one or more antennas 1216. These elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some aspects, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the BSs in connection with aspects of the present disclosure, for example, aspects of FIGS. 1-11, 14, and 15. Instructions 1206 may also be referred to as program code. The program code may be for causing a wireless communication device to perform these operations, for example by causing one or more processors (such as processor 1202) to control or command the wireless communication device to do so. The terms “instructions” and “code” should be interpreted broadly to include any type of computer-readable statement(s). For example, the terms “instructions” and “code” may refer to one or more programs, routines, sub-routines, functions, procedures, etc. “Instructions” and “code” may include a single computer-readable statement or many computer-readable statements.

The power mode configuration module 1208 and/or the communication module 1209 may be implemented via hardware, software, or combinations thereof. The power mode configuration module 1208 and/or the communication module 1209 may be implemented as a processor, circuit, and/or instructions 1206 stored in the memory 1204 and executed by the processor 1202. In some instances, the power mode configuration module 1208 and/or the communication module 1209 can be integrated within the modem subsystem 1212. The power mode configuration module 1208 and/or the communication module 1209 can be implemented by a combination of software components (e.g., executed by a DSP or a general processor) and hardware components (e.g., logic gates and circuitry) within the modem subsystem 1212. The power mode configuration module 1208 and/or the communication module 1209 may be used for various aspects of the present disclosure, for example, aspects of FIGS. 1-11, 14, and 15.

In some aspects, the power mode configuration module 1208 may be configured to communicate, with a second wireless communication device, a first power mode configuration including a first transmit power parameter. The communication module 1209 may be configured to communicate, with the second wireless communication device, a first communication signal based on the first power mode configuration. The power mode configuration module 1208 may be configured to communicate, with the second wireless communication device, a second power mode configuration including a second transmit power parameter different from the first transmit power parameter. The communication module 1209 may be configured to communicate, with the second wireless communication device, a second communication signal based on the second power mode configuration.

In some aspects, the power mode configuration module 1208 may be configured to transmit, to a first UE, a first power mode configuration including a first transmit power parameter specific to the first UE. The communication module 1209 may be configured to receive, from the first UE, a first communication signal based on the first power mode configuration. The power mode configuration module 1208 may be configured to transmit to a second UE different from the first UE, a second power mode configuration including a second transmit power parameter specific to the second UE. The communication module 1209 may be configured to receive, from the second UE, a second communication signal based on the second power mode configuration.

As shown, the transceiver 1210 may include the modem subsystem 1212 and the RF unit 1214. The transceiver 1210 can be configured to communicate bi-directionally with other devices, such as the UEs 115 and/or another core network element. The modem subsystem 1212 may be configured to modulate and/or encode data according to a modulation and coding schemes (MCS), e.g., a low density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., a power mode configuration including a transmit power parameter, communication signal based on the power mode configuration, etc.) from the modem subsystem 1212 (on outbound transmissions) or of transmissions originating from another source such as a UE 115 and/or UE 1000. The RF unit 1214 may be further configured to perform analog beamforming in conjunction with the digital beamforming. Although shown as integrated together in transceiver 1210, the modem subsystem 1212 and/or the RF unit 1214 may be separate devices that are coupled together at the BS 1200 to enable the BS 1200 to communicate with other devices.

The RF unit 1214 may provide the modulated and/or processed data, e.g. data packets (or, more generally, data messages that may contain one or more data packets and other information), to the antennas 1216 for transmission to one or more other devices. This may include, for example, transmission of information to complete attachment to a network and communication with a camped UE 115 or 1300 according to some aspects of the present disclosure. The antennas 1216 may further receive data messages transmitted from other devices and provide the received data messages for processing and/or demodulation at the transceiver 1210. The transceiver 1210 may provide the demodulated and decoded data (e.g., communication signals based on a power mode configuration (e.g., SP mode configuration and/or LP mode configuration)) to the power mode cm 1208 and/or the communication module 1209 for processing. The antennas 1216 may include multiple antennas of similar or different designs in order to sustain multiple transmission links.

In an aspect, the transceiver 1210 is configured to transmit a first power mode configuration including a first transmit power parameter and/or transmit a second power mode configuration including a second transmit power parameter by coordinating with the power mode configuration module 1208. In an aspect, the transceiver 1210 is configured to transmit and/or receive a first communication signal based on the first power mode configuration and/or transmit and/or receive a second communication signal based on the second power mode configuration by coordinating with the communication module 1209.

In an aspect, the transceiver 1210 is configured to transmit, to a first UE, a first power mode configuration including a first transmit power parameter specific to the first UE and/or transmit, to a second UE different from the first UE, a second power mode configuration including a second transmit power parameter specific to the second UE by coordinating with the power mode configuration module 1207. In an aspect, the transceiver 1210 is configured to receive, from the first UE, a first communication signal based on the first power mode configuration and to receive, from the second UE, a second communication signal based on the second power mode configuration by coordinating with the communication module 1209.

In some aspects, the BS 1200 can include multiple transceivers 1210 implementing different RATs (e.g., NR and LTE). In an aspect, the BS 1200 can include a single transceiver 1210 implementing multiple RATs (e.g., NR and LTE). In an aspect, the transceiver 1210 can include various components, where different combinations of components can implement different RATs.

Figure 13:
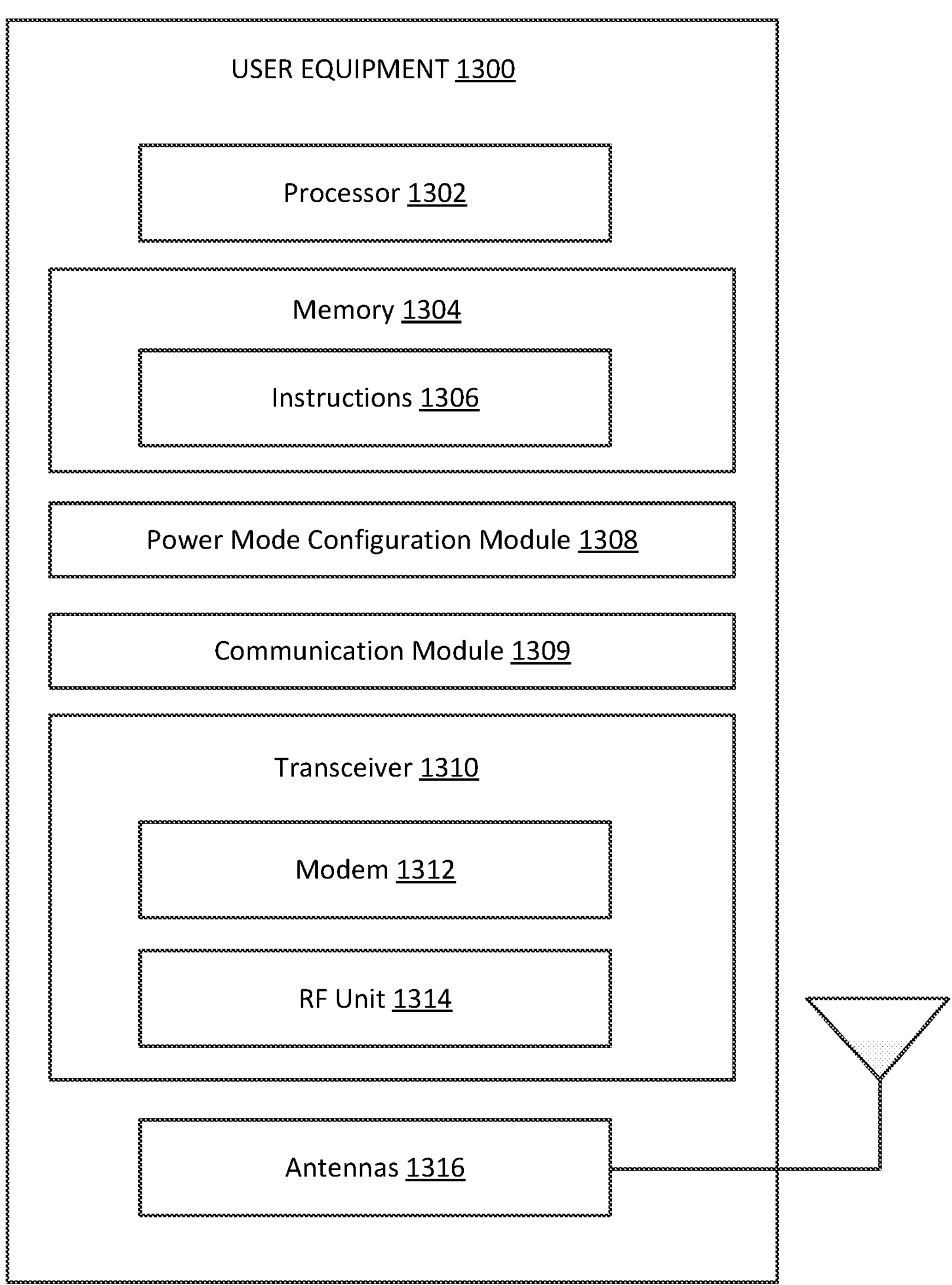
FIG. 13 is a block diagram of an example base station (BS) according to one or more aspects of the present disclosure.

FIG. 13 is a block diagram of a UE 1300 according to one or more aspects of the present disclosure. The UE 1300 may be a UE 115 discussed in relation to FIG. 1, a UE 315*a* or UE 315*b* as discussed in relation to FIG. 3, a UE 615 as discussed in relation to FIG. 6, or a UE 1115 as discussed in relation to FIG. 11. As shown, the UE 1300 may include a processor 1302, a memory 1304, a power mode configuration module 1308, a communication module 1309, a transceiver 1310 including a modem subsystem 1312 and an RF unit 1314, and one or more antennas 1316. These elements may be in direct or indirect communication with each other, for example via one or more buses.

The processor 1302 may have various features as a specific-type processor. For example, these may include a CPU, a DSP, an ASIC, a controller, a FPGA device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1304 may include a non-transitory computer-readable medium. The memory 1304 may store instructions 1306. The instructions 1306 may include instructions that, when executed by the processor 1302, cause the processor 1302 to perform operations described herein, for example, aspects of FIGS. 1-11, 14, and 16. Instructions 1306 may also be referred to as code, which may be interpreted broadly to include any type of computer-readable statement(s) as discussed above with respect to FIG. 12.

The power mode configuration module 1308 and/or the communication module 1309 may be implemented via hardware, software, or combinations thereof. The power mode configuration module 1308 and/or the communication module 1309 may be implemented as a processor, circuit, and/or instructions 1306 stored in the memory 1304 and executed by the processor 1302. In some instances, the power mode configuration module 1308 and/or the communication module 1309 can be integrated within the modem subsystem 1312. The power mode configuration module 1308 and/or the communication module 1309 can be implemented by a combination of software components (e.g., executed by a DSP or a general processor) and hardware components (e.g., logic gates and circuitry) within the modem subsystem 1312. The power mode configuration module 1308 and/or the communication module 1309 may be used for various aspects of the present disclosure, for example, aspects of FIGS. 1-11, 14, and 16.

In some aspects, the power mode configuration module 1308 may be configured to communicate, with a second wireless communication device, a first power mode configuration including a first transmit power parameter. The communication module 1309 may be configured to communicate, with the second wireless communication device, a first communication signal based on the first power mode configuration. The power mode configuration module 1308 may be configured to communicate, with the second wireless communication device, a second power mode configuration including a second transmit power parameter different from the first transmit power parameter. The communication module 1309 may be configured to communicate, with the second wireless communication device, a second communication signal based on the second power mode configuration.

In some aspects, the power mode configuration module 1308 may be configured to receive, from a BS, a first power mode configuration including a first transmit power parameter specific to the UE, the first transmit power parameter including at least one of a maximum transmit power or a maximum transmit PSD). The communication module 1309 may be configured to transmit, to the BS, a communication signal based on the first power mode configuration.

As shown, the transceiver 1310 may include the modem subsystem 1312 and the RF unit 1314. The transceiver 1310 can be configured to communicate bi-directionally with other devices, such as the BS 105 or the BS 1200. The modem subsystem 1312 may be configured to modulate and/or encode the data from the memory 1304, the power mode configuration module 1308, and/or the communication module 1309 according to an MCS, e.g., a LDPC coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., communication signals based on a power mode configuration (e.g., SP mode configuration and/or LP mode configuration), etc.) from the modem subsystem 1312 (on outbound transmissions) or of transmissions originating from another source such as a UE 115 or the BS 105. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the UE 1300 to enable the UE 1300 to communicate with other devices.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices. The antennas 1316 may provide the received data messages for processing and/or demodulation at the transceiver 1310. The transceiver 1310 may provide the demodulated and decoded data (e.g., power mode configuration including a transmit power parameter, communication signal based on the power mode configuration, etc.) to the power mode configuration module 1308 and/or the communication module 1309 for processing. The antennas 1316 may include multiple antennas of similar or different designs in order to sustain multiple transmission links. The RF unit 1314 may configure the antennas 1316.

In an aspect, the transceiver 1310 is configured to receive a first power mode configuration including a first transmit power parameter and/or receive a second power mode configuration including a second transmit power parameter by coordinating with the power mode configuration module 1208. In an aspect, the transceiver 1210 is configured to transmit and/or receive a first communication signal based on the first power mode configuration and/or transmit and/or receive a second communication signal based on the second power mode configuration by coordinating with the communication module 1209.

In an aspect, the transceiver 1310 is configured to receive from a BS, a first power mode configuration including a first transmit power parameter specific to the UE, the first transmit power parameter including at least one of a maximum transmit power or a maximum transmit PSD by coordinating with the power mode configuration module 1308. In an aspect, the transceiver 1310 is configured to transmit to the BS, a communication signal based on the first power mode configuration by coordinating with the communication module 1309.

In some aspects, the UE 1300 can include multiple transceivers 1310 implementing different radio access technologies (RATs) (e.g., NR and LTE). In an aspect, the UE 1300 can include a single transceiver 1310 implementing multiple RATs (e.g., NR and LTE). In an aspect, the transceiver 1310 can include various components, where different combinations of components can implement different RATs.

Figure 14:
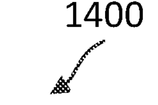
FIG. 14 is a flow diagram of a wireless communication method according to one or more aspects of the present disclosure.
Figure 14:
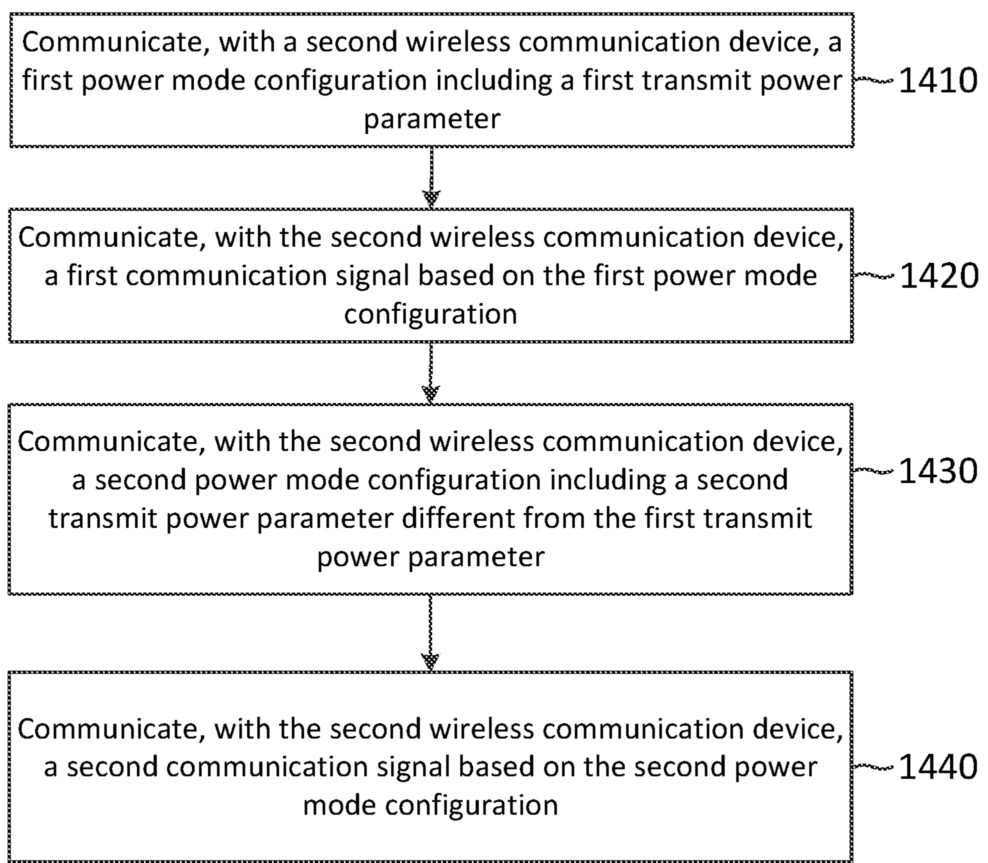

FIG. 14 is a flow diagram of a wireless communication method 1400 according to one or more aspects of the present disclosure. Aspects of the method 1400 can be executed by a computing device (e.g., a processor, processing circuit, and/or other suitable component) of a wireless communication device or other suitable means for executing the blocks. In some examples, a wireless communication device, such as the UEs 115, UE 315*a*, UE 315*b*, UE 615, and/or UE 1115, may utilize one or more components, such as the processor 1302, the memory 1304, the power mode configuration module 1308, the communication module 1309, the transceiver 1310, the modem 1312, and the one or more antennas 1316, to execute the blocks of method 1400. In some examples, a wireless communication device, such as the BSs 105, BS 305, BS 605, BS 1105, may utilize one or more components, such as the processor 1202, the memory 1204, the power mode configuration module 1208, the communication module 1209, the transceiver 1210, the modem 1212, and the one or more antennas 1216, to execute the blocks of method 1400. The method 1400 may employ similar mechanisms as discussed in relation to FIGS. 1-13, 15, and 16. As illustrated, the method 1400 includes a number of enumerated blocks, but aspects of the method 1400 may include additional blocks before, after, and in between the enumerated blocks. In some aspects, one or more of the enumerated blocks may be omitted or performed in a different order.

At block 1410, the method 1400 includes communicating, with a second wireless communication device, a first power mode configuration including a first transmit power parameter. In an instance, the BS 105 may transmit to the UE 115, a first power mode configuration including a first transmit power parameter. In another instance, the UE 115 may receive from the BS 105, a first power mode configuration including a first transmit power parameter.

At block 1420, the method 1400 includes communicating, with the second wireless communication device, a first communication signal based on the first power mode configuration. In an instance, the BS 105 may receive the first communication signal from a UE 115 or transmit the first communication signal to the UE 115. In another instance, the UE 115 may receive the first communication signal from a BS 105 or transmit the first communication signal to the BS 105.

At block 1430, the method 1400 includes communicating, with the second wireless communication device, a second power mode configuration including a second transmit power parameter different from the first transmit power parameter. In an instance, the BS 105 may transmit to the UE 115, a second power mode configuration including a second transmit power parameter. In another instance, the UE 115 may receive from the BS 105, a second power mode configuration including a second transmit power parameter.

At block 1440, the method 1400 includes communicating, with the second wireless communication device, a second communication signal based on the second power mode configuration. In an instance, the BS 105 may receive the second communication signal from a UE 115 or transmit the second communication signal to the UE 115. In another instance, the UE 115 may receive the second communication signal from a BS 105 or transmit the second communication signal to the BS 105.

In some aspects, the first power mode configuration includes an SP mode configuration, and the second power mode configuration includes an LP mode configuration. In some aspects, the first power mode configuration includes a first SP mode configuration, and the second power mode configuration includes a second SP mode configuration. The first transmit power parameter may be, for example, a maximum transmit power or a maximum transmit PSD. The second transmit power parameter may be, for example, a maximum transmit power or a maximum transmit PSD.

Figure 15:
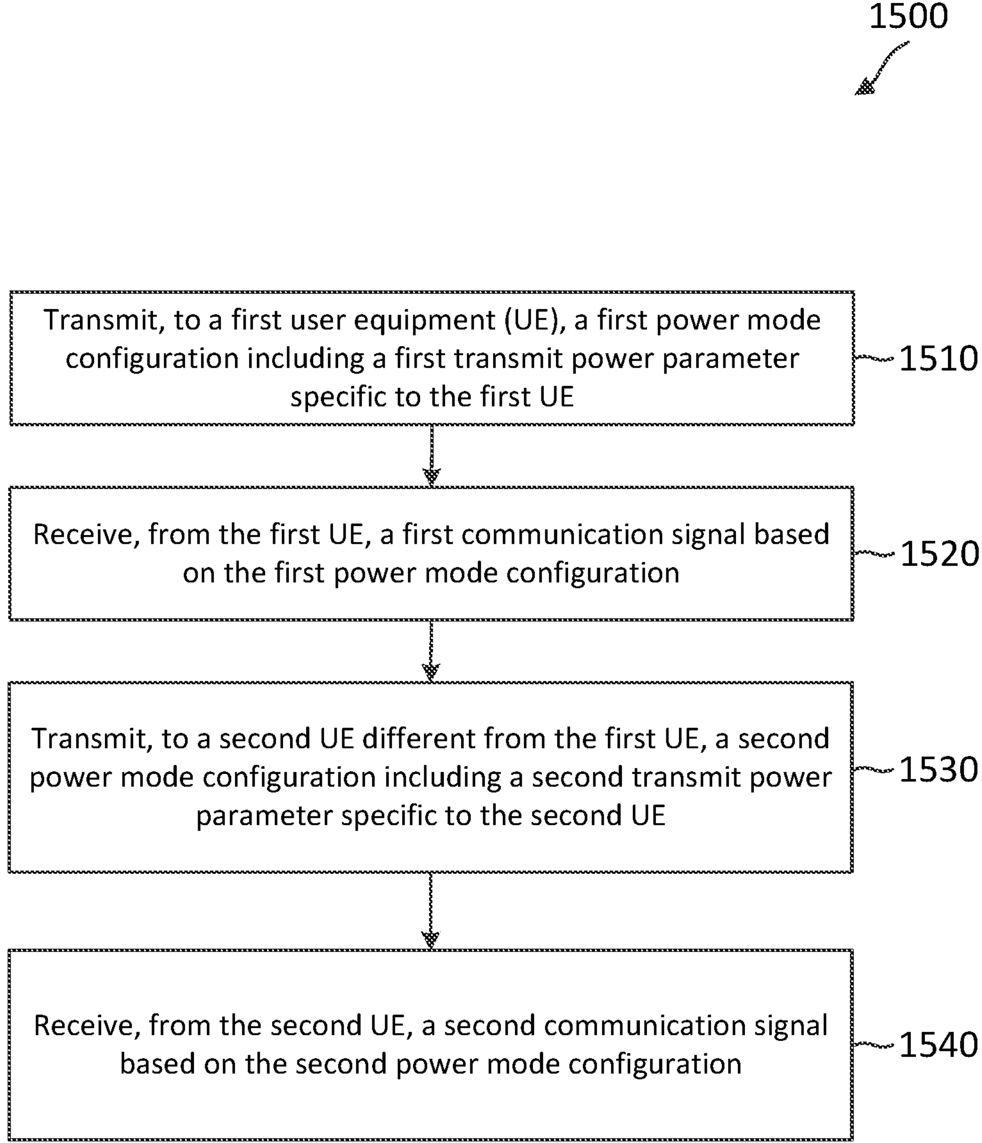
FIG. 15 is a flow diagram of a wireless communication method according to one or more aspects of the present disclosure.

FIG. 15 is a flow diagram of a wireless communication method 1500 according to one or more aspects of the present disclosure. Aspects of the method 1500 can be executed by a computing device (e.g., a processor, processing circuit, and/or other suitable component) of a wireless communication device or other suitable means for executing the blocks. In some examples, a wireless communication device, such as the BSs 105, BS 305, BS 605, BS 1105, may utilize one or more components, such as the processor 1202, the memory 1204, the power mode configuration module 1208, the communication module 1209, the transceiver 1210, the modem 1212, and the one or more antennas 1216, to execute the blocks of method 1500. The method 1500 may employ similar mechanisms as discussed relation to FIGS. 1-13, 14, and 16. As illustrated, the method 1500 includes a number of enumerated blocks, but aspects of the method 1500 may include additional blocks before, after, and in between the enumerated blocks. In some aspects, one or more of the enumerated blocks may be omitted or performed in a different order.

At block 1510, the method 1500 includes transmitting, to a first UE, a first power mode configuration including a first transmit power parameter specific to the first UE. In an instance, the BS 105 may transmit to the first UE, a first RRC message indicating the first power mode configuration. At block 1520, the method 1500 includes receiving, from the first UE, a first communication signal based on the first power mode configuration.

At block 1530, the method 1500 includes transmitting, to a second UE different from the first UE, a second power mode configuration including a second transmit power parameter specific to the second UE. In an instance, the BS 105 may transmit to the second UE, a second RRC message indicating the second power mode configuration. At block 1540, the method 1500 includes receiving, from the second UE, a second communication signal based on the second power mode configuration.

In some aspects, the first power mode configuration includes an SP mode configuration, and the second power mode configuration includes an LP mode configuration. The first transmit power parameter may include a first maximum transmit power that is specific to the first UE and is based on a second maximum transmit power of the BS, and the second transmit power parameter may include a first maximum transmit PSD that is specific to the second UE and is based on a second maximum transmit PSD of the BS. The first transmit power parameter may include a first maximum transmit PSD that is specific to the first UE and is based on a second maximum transmit PSD of the BS, and the second transmit power parameter may include a third maximum transmit PSD that is specific to the second UE and is based on the second maximum transmit PSD of the BS.

In some aspects, the first power mode configuration includes a first SP mode configuration, and the second power mode configuration includes a second SP mode configuration. The BS 105 may configure a first UL BWP for the first SP mode configuration, where the first transmit power parameter is a first UL maximum transmit power of the first UE or of the BS, and the BS uses a first DL maximum transmit power. The BS 105 may configure a second UL BWP for the second SP mode configuration, where the second transmit power parameter is a second UL maximum transmit power of the second UE or of the BS, the BS uses a second DL maximum transmit power. In some instances, the first UL maximum transmit power may be different from the second UL maximum transmit power. In some instances, the first DL maximum transmit power may be different from the second DL maximum transmit power. In some instances, the first transmit power parameter may include a first maximum transmit power that is specific to the first UE and is based on a second maximum transmit power of the BS, and the second transmit power parameter may include a third maximum transmit power that is specific to the second UE and is based on the second maximum transmit power of the BS.

Figure 16:
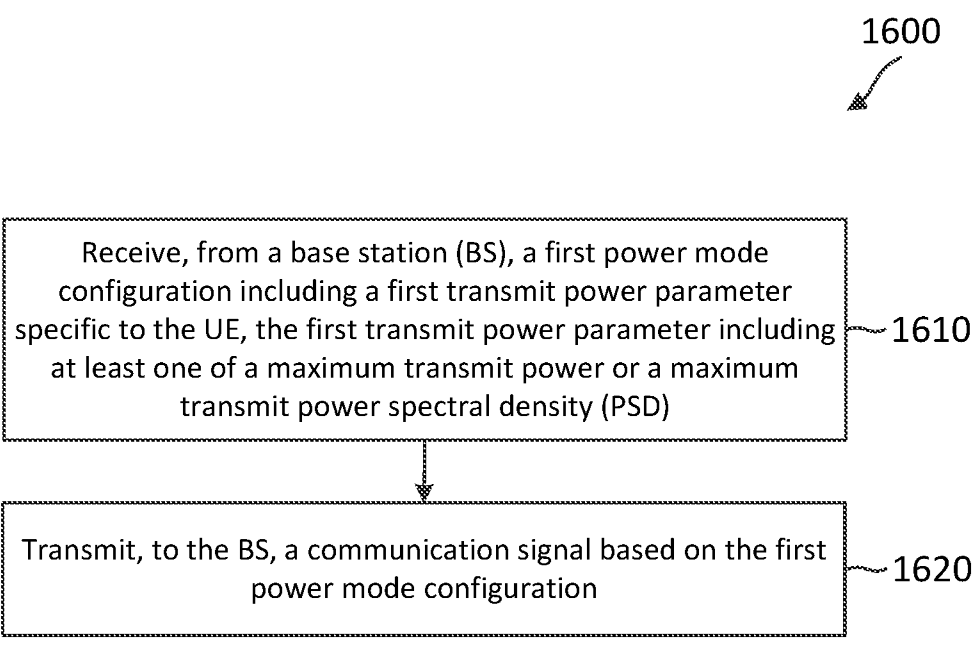
FIG. 16 is a flow diagram of a wireless communication method according to one or more aspects of the present disclosure.

FIG. 16 is a flow diagram of a wireless communication method 1600 according to one or more aspects of the present disclosure. Aspects of the method 1600 can be executed by a computing device (e.g., a processor, processing circuit, and/or other suitable component) of a wireless communication device or other suitable means for executing the blocks. In some examples, a wireless communication device, such as the UEs 115, UE 315*a*, UE 315*b*, UE 615, and/or UE 1115, may utilize one or more components, such as the processor 1302, the memory 1304, the power mode configuration module 1308, the communication module 1309, the transceiver 1310, the modem 1312, and the one or more antennas 1316, to execute the blocks of method 1600. The method 1600 may employ similar mechanisms as discussed in relation to FIGS. 1-15. As illustrated, the method 1600 includes a number of enumerated blocks, but aspects of the method 1600 may include additional blocks before, after, and in between the enumerated blocks. In some aspects, one or more of the enumerated blocks may be omitted or performed in a different order.

At block 1610, the method 1600 includes receiving, from a base station (BS), a first power mode configuration including a first transmit power parameter specific to the UE, the first transmit power parameter including at least one of a maximum transmit power or a maximum transmit PSD. At block 1620, the method 1600 includes transmitting, to the BS, a communication signal based on the first power mode configuration.

In some aspects, the first power mode configuration includes an SP mode configuration, and the second power mode configuration includes an LP mode configuration. The first power mode configuration may include a first SP mode configuration, and the second power mode configuration may include a second SP mode configuration. In an instance, the UE 115 may receive, from the BS 105, a first RRC message indicating the first power mode configuration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising, at a first wireless communication device:

communicating, with a second wireless communication device, a first power mode configuration including a first transmit power parameter;

communicating, with the second wireless communication device, a first communication signal during a first time period based on the first power mode configuration;

communicating, with the second wireless communication device, a second power mode configuration including a second transmit power parameter different from the first transmit power parameter; and communicating, with the second wireless communication device, a second communication signal during a second time period based on the second power mode configuration, the second time period being different from the first time period.

2. The method of claim 1, wherein the first power mode configuration includes a standard power (SP) mode configuration, and the second power mode configuration includes a low-power (LP) mode configuration.

3. The method of claim 2, wherein the first wireless communication device includes a base station (BS), and the second wireless communication device includes a user equipment (UE), the method further comprising, at the BS:

configuring a first uplink (UL) maximum transmit power of the BS for the first transmit power parameter of the SP mode configuration; and configuring a second UL maximum transmit power of the BS for the second transmit power parameter of the LP mode configuration.

4. The method of claim 2, wherein the first wireless communication device includes a BS, and the second wireless communication device includes a UE, the method further comprising, at the BS:

configuring a first UL maximum transmit power spectral density (PSD) of the BS for the first transmit power parameter of the SP mode configuration; and configuring a second UL maximum transmit PSD of the BS for the second transmit power parameter of the LP mode configuration.

5. The method of claim 2, wherein communicating the first communication signal includes communicating the first communication signal in a first UL BWP based on the SP mode configuration, and wherein communicating the second communication signal includes communicating the second communication signal in a second UL BWP based on the LP mode configuration.

6. The method of claim 5, wherein communicating the first power mode configuration includes communicating a first BWP switch configuration for switching from the second UL BWP to the first UL BWP, the first BWP switch configuration including the first power mode configuration, and wherein communicating the second power mode configuration includes communicating a second BWP switch configuration for switching from the first UL BWP to the second UL BWP, the second BWP switch configuration including the second power mode configuration.

7. The method of claim 5, further comprising, at the first wireless communication device:

configuring a first UL transmission equivalent isotropically radiated power (EIRP) for the first UL BWP and a second UL transmission EIRP for the second UL BWP, the second UL transmission EIRP being different from the first UL transmission EIRP.

8. The method of claim 5, further comprising, at the first wireless communication device:

configuring a first UL transmission EIRP power spectral density (PSD) (EIRP PSD) for the first UL BWP and a second UL transmission EIRP PSD for the second UL BWP, the second EIRP PSD being different from the first EIRP PSD.

9. The method of claim 2, wherein the first transmit power parameter includes a first maximum transmit power spectral density (PSD) for a first subband within an UL BWP, wherein the second transmit power parameter includes a second maximum transmit PSD for a second subband within the BWP, the first subband being different from the second subband.

10. The method of claim 2, wherein communicating the first power mode configuration includes communicating the first power mode configuration in a first RRC configuration, and wherein the communicating the second power mode configuration includes communicating the second power mode configuration in a second RRC configuration.

11. The method as in claim 2, wherein communicating the first power mode configuration includes communicating the first power mode configuration in a first UE-specific RRC configuration, and wherein the communicating the second power mode configuration includes communicating the second power mode configuration in a second UE-specific RRC configuration.

12. The method of claim 2, wherein the first wireless communication device includes a base station (BS), and wherein the first transmit power parameter includes a first maximum transmit power spectral density (PSD) of the BS for all subbands within an UL BWP, and wherein the second transmit power parameter includes a second maximum transmit PSD of the BS for all subbands within the UL BWP.

13. The method of claim 2, wherein the first transmit power parameter includes a first maximum transmit power spectral density (PSD) for a first subband within a first UL BWP and a second maximum transmit PSD for a second subband within the first UL BWP, the first subband being different from the first subband, and wherein the second transmit power parameter includes a third maximum transmit PSD for a third subband within a second UL BWP and a fourth maximum transmit PSD for a fourth subband within the second UL BWP, the third subband being different from the fourth subband.

14. The method of claim 1, wherein:

the first power mode configuration includes a first SP mode configuration, and the second power mode configuration includes a second SP mode configuration different from the first SP mode configuration;

communicating the first communication signal includes communicating the first communication signal in a first UL BWP based on the first SP mode configuration; and communicating the second communication signal includes communicating the second communication signal in a second UL BWP based on the second SP mode configuration.

15. The method of claim 14, wherein the second wireless communication device includes a UE, wherein the first UL BWP and the second UL BWP include a different amount of frequency bandwidths, and wherein the first transmit power parameter and the second transmit power parameter indicate a same maximum transmit power of the UE.

16. The method of claim 14, wherein the first wireless communication device includes a BS, and wherein the second wireless communication device includes a UE, further comprising, at the BS:

configuring the first UL BWP for the first SP mode configuration, the first transmit power parameter being a first UL maximum transmit power of the BS, and the BS using a first downlink (DL) maximum transmit power; and configuring the second UL BWP for the second SP mode configuration, the second transmit power parameter being a second UL maximum transmit power of the BS, and the BS using a second DL maximum transmit power.

17. The method of claim 1, wherein the first wireless communication device includes a base station (BS), and wherein communicating the first power mode configuration includes communicating a downlink control information (DCI) indicating the first power mode configuration, and the first transmit power parameter includes an UL maximum transmit power of the BS.

18. The method of claim 17, wherein communicating the DCI includes communicating the DCI in one of:

a group common (GC)-physical downlink control channel (PDCCH); or a DE-specific DCI indicating a grant including a set of bits, the set of bits indicating whether to communicate the first communication signal based on the first power mode configuration or to communicate the second communication signal based on the second power mode configuration.

19. The method of claim 1, wherein the first wireless communication device includes a base station (BS), and wherein communicating the first power mode configuration includes communicating a DCI indicating the first power mode configuration, and the first transmit power parameter includes an UL maximum transmit power spectral density (PSD) of the BS.

20. The method of claim 1, further comprising, at the first wireless communication device:

communicating, with a second wireless communication device, a system information block (SIB) indicating a maximum transmit power of a base station (BS), the BS being the first wireless communication device or the second wireless communication device; and determining the first transmit power parameter based on the maximum transmit power of the BS.

21. An apparatus, comprising:

means for communicating, with a second wireless communication device, a first power mode configuration including a first transmit power parameter;

means for communicating, with the second wireless communication device, a first communication signal during a first time period based on the first power mode configuration;

means for communicating, with the second wireless communication device, a second power mode configuration including a second transmit power parameter different from the first transmit power parameter; and means for communicating, with the second wireless communication device, a second communication signal during a second time period based on the second power mode configuration, the second time period being different from the first time period.

22. A first wireless communications device, comprising:

one or more memories; and one or more processors, coupled to the one or more memories, configured to cause the first wireless communications device to:

communicate, with a second wireless communication device, a first power mode configuration including a first transmit power parameter;

communicate, with the second wireless communication device, a first communication signal during a first time period based on the first power mode configuration;

communicate, with the second wireless communication device, a second power mode configuration including a second transmit power parameter different from the first transmit power parameter; and communicate, with the second wireless communication device, a second communication signal during a second time period based on the second power mode configuration, the second time period being different from the first time period.

23. The first wireless communications device of claim 22, wherein the first power mode configuration includes a standard power (SP) mode configuration, and the second power mode configuration includes a low-power (LP) mode configuration.

24. The first wireless communications device of claim 23, wherein the first wireless communication device includes a base station (BS) and the second wireless communication device includes a user equipment (UE), and wherein the one or more processors are further configured to:

configure a first uplink (UL) maximum transmit power of the BS for the first transmit power parameter of the SP mode configuration; and configure a second UL maximum transmit power of the BS for the second transmit power parameter of the LP mode configuration.

25. The first wireless communications device of claim 23, wherein the first wireless communication device includes a BS and the second wireless communication device includes a UE, and wherein the one or more processors are further configured to:

configure a first UL maximum transmit power spectral density (PSD) of the BS for the first transmit power parameter of the SP mode configuration; and configure a second UL maximum transmit PSD of the BS for the second transmit power parameter of the LP mode configuration.

26. The first wireless communications device of claim 23, wherein the one or more processors, to communicate the first communication signal, are configured to communicate the first communication signal in a first UL BWP based on the SP mode configuration, and wherein the one or more processors, to communicate the second communication signal, are configured to communicate the second communication signal in a second UL BWP based on the LP mode configuration.

27. The first wireless communications device of claim 26, wherein the one or more processors, to communicate the first power mode configuration, are further configured to communicate a first BWP switch configuration for switching from the second UL BWP to the first UL BWP, the first BWP switch configuration including the first power mode configuration, and wherein the one or more processors, to communicate the second power mode configuration, are further configured to communicate a second BWP switch configuration for switching from the first UL BWP to the second UL BWP, the second BWP switch configuration including the second power mode configuration.

28. The first wireless communications device of claim 23, wherein the first transmit power parameter includes a first maximum transmit power spectral density (PSD) for a first subband within an UL BWP, wherein the second transmit power parameter includes a second maximum transmit PSD for a second subband within the BWP, the first subband being different from the second subband.

29. The first wireless communications device of claim 23, wherein the one or more processors, to communicate the first power mode configuration, are further configured to communicate the first power mode configuration in a first RRC configuration, and wherein the one or more processors, to communicate the second power mode configuration, are further configured to communicate the second power mode configuration in a second RRC configuration.

30. The first wireless communications device of claim 22, wherein the first power mode configuration includes a first SP mode configuration and the second power mode configuration includes a second SP mode configuration different from the first SP mode configuration, wherein the one or more processors, to communicate the first communication signal, are further configured to communicate the first communication signal in a first UL BWP based on the first SP mode configuration, and wherein the one or more processors, to communicate the second communication signal, are further configured to communicate the second communication signal in a second UL BWP based on the second SP mode configuration.

31. The first wireless communications device of claim 30, wherein second wireless communication device includes a UE, and wherein the second wireless communication device includes a UE, and wherein the first UL BWP and the second UL BWP include a different amount of frequency bandwidths, and wherein the first transmit power parameter and the second transmit power parameter indicate a same maximum transmit power of the UE.

32. The first wireless communications device of claim 30, wherein the first wireless communication device includes a BS, and wherein the second wireless communication device includes a UE, and wherein the one or more processors are further configured to:

configure the first UL BWP for the first SP mode configuration, the first transmit power parameter being a first UL maximum transmit power of the BS, and the BS using a first downlink (DL) maximum transmit power; and configure the second UL BWP for the second SP mode configuration, the second transmit power parameter being a second UL maximum transmit power of the BS, and the BS using a second DL maximum transmit power.

33. A non-transitory computer-readable medium storing a set of instructions for wireless communication, the set of instructions comprising:

one or more instructions that, when executed by one or more processors of a first wireless communication device, cause the first wireless communication device to:

communicate, with a second wireless communication device, a first power mode configuration including a first transmit power parameter;

communicate, with the second wireless communication device, a first communication signal during a first time period based on the first power mode configuration;

communicate, with the second wireless communication device, a second power mode configuration including a second transmit power parameter different from the first transmit power parameter; and communicate, with the second wireless communication device, a second communication signal during a second time period based on the second power mode configuration, the second time period being different from the first time period.

* * * * *